US011667844B2

(12) United States Patent
Yoon et al.

(10) Patent No.: US 11,667,844 B2
(45) Date of Patent: Jun. 6, 2023

(54) LIQUID CRYSTAL ALIGNMENT COMPOSITION, METHOD OF PREPARING LIQUID CRYSTAL ALIGNMENT FILM, AND LIQUID CRYSTAL ALIGNMENT FILM, AND LIQUID CRYSTAL DISPLAY USING THE SAME

(71) Applicant: LG CHEM, LTD., Seoul (KR)

(72) Inventors: Jun Young Yoon, Daejeon (KR); Kichul Koo, Daejeon (KR); Jung Ho Jo, Daejeon (KR); Soonho Kwon, Daejeon (KR); Hyeongseuk Yun, Daejeon (KR); Seongku Kim, Daejeon (KR); Hoonseo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 226 days.

(21) Appl. No.: 17/048,264

(22) PCT Filed: Nov. 12, 2019

(86) PCT No.: PCT/KR2019/015359
§ 371 (c)(1),
(2) Date: Oct. 16, 2020

(87) PCT Pub. No.: WO2020/105934
PCT Pub. Date: May 28, 2020

(65) Prior Publication Data
US 2021/0040390 A1    Feb. 11, 2021

(30) Foreign Application Priority Data

Nov. 20, 2018   (KR) .................. 10-2018-0143869

(51) Int. Cl.
*C09K 19/56*   (2006.01)
*G02F 1/1337*  (2006.01)

(52) U.S. Cl.
CPC .......... *C09K 19/56* (2013.01); *B32B 2457/20* (2013.01); *B32B 2457/202* (2013.01); *C09K 2219/03* (2013.01); *C09K 2323/00* (2020.08); *C09K 2323/02* (2020.08); *C09K 2323/023* (2020.08); *C09K 2323/027* (2020.08); *G02F 1/1337* (2013.01); *G02F 1/133711* (2013.01); *G02F 1/133723* (2013.01)

(58) Field of Classification Search
CPC .......... B32B 2457/20; B32B 2457/202; C08G 73/10; C08G 73/1007; C08L 79/08; C09D 179/08; C09K 19/56; C09K 2219/03; C09K 2323/00; C09K 2323/02; C09K 2323/023; C09K 2323/027; G02F 1/1337; G02F 1/133711; G02F 1/133723
See application file for complete search history.

(56) References Cited

U.S. PATENT DOCUMENTS

| 10,054,820 | B2 | 8/2018 | Kang et al. |
| 10,066,166 | B2 | 9/2018 | Lee et al. |
| 2010/0243955 | A1 | 9/2010 | Tsai et al. |
| 2012/0101236 | A1 | 4/2012 | Sakumoto et al. |
| 2016/0109759 | A1 | 4/2016 | Kang et al. |
| 2018/0231845 | A1 | 8/2018 | Kwon et al. |
| 2018/0298284 | A1 | 10/2018 | Jo et al. |
| 2018/0348578 | A1 | 12/2018 | Jo et al. |
| 2019/0106628 | A1 | 4/2019 | Yun et al. |
| 2020/0392409 | A1 | 12/2020 | Yun et al. |
| 2021/0032540 | A1 | 2/2021 | Yoon et al. |
| 2021/0061976 | A1 | 3/2021 | Koo et al. |
| 2021/0139782 | A1 | 5/2021 | Kim et al. |

FOREIGN PATENT DOCUMENTS

| CN | 104974768 A | 10/2015 |
| CN | 105527756 A | 4/2016 |
| CN | 105723276 A | 6/2016 |
| CN | 106716237 A | 5/2017 |
| CN | 107849247 A | 3/2018 |
| CN | 108138051 A | 6/2018 |
| CN | 108291149 A | 7/2018 |
| CN | 110475840 A | 11/2019 |
| CN | 111868211 A | 10/2020 |
| EP | 3575381 A1 | 12/2019 |
| JP | 2012-150251 A | 8/2012 |
| JP | 2012-193167 A | 10/2012 |
| JP | 2013-167888 A | 8/2013 |
| JP | 2015-212807 A | 11/2015 |
| JP | 2015-215591 A | 12/2015 |
| JP | 2015-222387 A | 12/2015 |
| JP | 2015215591 A * | 12/2015 |
| JP | 2016-081057 A | 5/2016 |
| JP | 2016-139121 A | 8/2016 |
| JP | 2016-218149 A | 12/2016 |
| JP | 2017-009655 A | 1/2017 |
| JP | 2020-510235 A | 4/2020 |
| KR | 10-2009-0119286 A | 11/2009 |

(Continued)

OTHER PUBLICATIONS

PCT Search Report issued for PCT/KR2019/015358 dated Mar. 4, 2020, 2 pages.
PCT Search Report issued for PCT/KR2019/015359 dated Mar. 4, 2020, 2 pages.
PCT Search Report issued for PCT/KR2020/000805 dated Apr. 29, 2020, 2 pages.
Extended European Search Report dated Nov. 23, 2020, of the corresponding European Patent Application No. 20744241.9, 7 pages.

*Primary Examiner* — Eli D. Strah
(74) *Attorney, Agent, or Firm* — Rothwell, Figg, Ernst & Manbeck, P.C.

(57) ABSTRACT

The present invention relates to a liquid crystal alignment composition that not only exhibits high degree of imidization and excellent film strength when manufacturing a liquid crystal alignment film, but also can realize improved alignment property and electrical properties, a method for preparing a liquid crystal alignment film using the same, a liquid crystal alignment film and a liquid crystal display using the same.

15 Claims, No Drawings

(56) References Cited

FOREIGN PATENT DOCUMENTS

| | | |
|---|---|---|
| KR | 10-2011-0079733 A | 7/2011 |
| KR | 10-2012-0084253 A | 7/2012 |
| KR | 10-2013-0001144 A | 1/2013 |
| KR | 10-2013-0109018 A | 10/2013 |
| KR | 10-2014-0076427 A | 6/2014 |
| KR | 10-2015-0118527 A | 10/2015 |
| KR | 10-2015-0122584 A | 11/2015 |
| KR | 10-2016-0047030 A | 5/2016 |
| KR | 10-2016-0095801 A | 8/2016 |
| KR | 10-2017-0028473 A | 3/2017 |
| KR | 10-2017-0063677 A | 6/2017 |
| KR | 10-2017-0127966 A | 11/2017 |
| KR | 10-2017-0143365 A | 12/2017 |
| KR | 10-1823712 B1 | 1/2018 |
| KR | 10-2018-0020722 A | 2/2018 |
| KR | 10-2019-0003233 A | 1/2019 |
| KR | 10-2019-0087819 A | 7/2019 |
| TW | 200804519 A | 1/2008 |
| TW | 201035171 A | 10/2010 |
| TW | 201231505 A | 8/2012 |
| TW | 201540777 A | 11/2015 |
| WO | 2010-114103 A1 | 10/2010 |
| WO | 2011-149071 A1 | 12/2011 |
| WO | 2015-072554 A1 | 5/2015 |
| WO | 2016-047774 A1 | 3/2016 |
| WO | 2017-119461 A1 | 7/2017 |
| WO | 2017-196001 A1 | 11/2017 |
| WO | WO-2017196001 A1 * 11/2017 ............. C09K 19/52 |
| WO | 2018-034409 A1 | 2/2018 |
| WO | WO-2018034409 A1 * 2/2018 ........... C09D 177/06 |
| WO | 2018-092811 A1 | 5/2018 |

* cited by examiner

LIQUID CRYSTAL ALIGNMENT COMPOSITION, METHOD OF PREPARING LIQUID CRYSTAL ALIGNMENT FILM, AND LIQUID CRYSTAL ALIGNMENT FILM, AND LIQUID CRYSTAL DISPLAY USING THE SAME

CROSS-REFERENCE TO RELATED APPLICATION(S)

This application is a 35 U.S.C. 371 National Phase Entry Application from PCT/KR2019/015359 filed on Nov. 12, 2019, designating the United States, which claims the benefit of Korean Patent Application No. 10-2018-0143869 filed on Nov. 20, 2018 with the Korean Intellectual Property Office, the disclosures of which are herein incorporated by reference in their entirety.

The present invention relates to a liquid crystal alignment composition that not only exhibits high degree of imidization and excellent film strength when manufacturing a liquid crystal alignment film, but also can realize improved alignment property and electrical properties, a method for preparing a liquid crystal alignment film using the same, a liquid crystal alignment film and a liquid crystal display using the same.

BACKGROUND OF THE INVENTION

In a liquid crystal display, a liquid crystal alignment film performs a function for aligning liquid crystals in a constant direction. Specifically, the liquid crystal alignment film functions as a director in the arrangement of liquid crystal molecules, and thus, when liquid crystals move by an electric field to form an image, it makes them headed in a proper direction. In order to obtain uniform brightness and high contrast ratio in a liquid crystal display, it is essential to uniformly align liquid crystals As one of the existing methods of aligning liquid crystals, a method of applying a polymer film such as polyimide on a substrate such as glass, and rubbing the surface to a constant direction using fiber such as nylone or polyester was used. However, such a rubbing method may generate powdery dust or electrical discharge (ESD) when the fiber and polymer film are rubbed, thus causing a serious problem when preparing a liquid crystal panel.

In order to solve the problem of the rubbing method, a photo-alignment method is being recently studied, wherein anisotropy is induced to a polymer film by light irradiation instead of friction, and liquid crystals are arranged using the anisotropy.

As the material that can be used in the photo-alignment method, various materials have been introduced, and among them, polyimide is being mainly used for good performances of a liquid crystal alignment film. For this, a precursor such as polyamic acid or polyamic acid ester having excellent solubility is coated, which is then heat treated at 200° C. to 230° C. to form polyimide, which is irradiated by light, thereby progressing alignment treatment.

However, in order to obtain sufficient liquid crystal alignment property by light irradiation to a polyimide film, a lot of energy is required, and thus, there is a difficulty in securing productivity. Moreover, additional heat treatment is required so as to secure alignment stability after light irradiation, and as friction of column space (CS) is generated due to large panel, haze is generated on the surface of a liquid crystal alignment film, and thus, white dots are caused, and the performance of a panel cannot be sufficiently realized.

And, for the high quality driving of a liquid crystal display, high voltage holding ratio (VHR) should be exhibited, but polyimide has a limitation. Particularly, with a recent increase in demand for low power display, it was found out that a liquid crystal alignment agent may have an influence on the electrical properties such as afterimage generated by direct current/alternating current voltage, and voltage holding ratio, as well as alignment property of liquid crystals. Thus, there is an increasing demand for the development of liquid crystal alignment material capable of simultaneously realizing excellent liquid crystal alignment property and electrical properties.

Thus, a method of adding various cross-linking agents to a liquid crystal alignment composition has been suggested so as to prepare a liquid crystal alignment film having high film strength required in the field of displays, but due to the simple addition of the cross-linking agent compound, electrical properties at high temperature, low frequency decrease. Thus, there was a difficulty in the preparation of a liquid crystal alignment film that can be applied for a high performance/low power display.

Thus, there is a demand for the development of a liquid crystal alignment composition that can prepare an alignment film having high film strength, can increase alignment property and electrical properties of the alignment film, and may have high degree of imidization even when applied for the preparation process of a liquid crystal alignment film.

BRIEF SUMMARY OF THE INVENTION

The present invention provides a liquid crystal alignment composition that may exhibit high degree of imidization and afford excellent film strength when manufacturing a liquid crystal alignment film, and simultaneously, can realize improved alignment property and electrical properties.

The present invention also provides a method for preparing a liquid crystal alignment film using the liquid crystal alignment composition.

The present invention further provides a liquid crystal alignment film comprising the aligned and cured product of the liquid crystal alignment composition, and a liquid crystal display comprising the same.

A liquid crystal alignment composition is provided herein, which comprises: first liquid crystal alignment polymer comprising one or more kinds of repeat units selected from the group consisting of repeat units represented by the following Chemical Formula 1, repeat units represented by the following Chemical Formula 2, and repeat units represented by the following Chemical Formula 3; second liquid crystal alignment polymer comprising one or more kinds of repeat units selected from the group consisting of repeat units represented by the following Chemical Formula 4, repeat units represented by the following Chemical Formula 5, and repeat units represented by the following Chemical Formula 6: third liquid crystal alignment polymer comprising one or more kinds of repeat units selected from the group consisting of repeat units represented by the following Chemical Formula 7, repeat units represented by the following Chemical Formula 8, and repeat units represented by the following Chemical Formula 9; and a cross-linking agent compound represented by the following Chemical Formula 16:

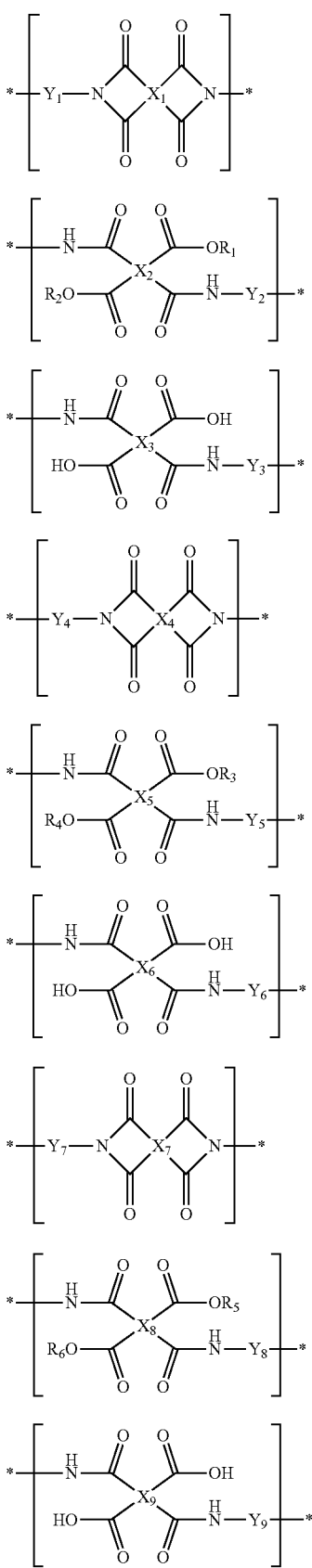

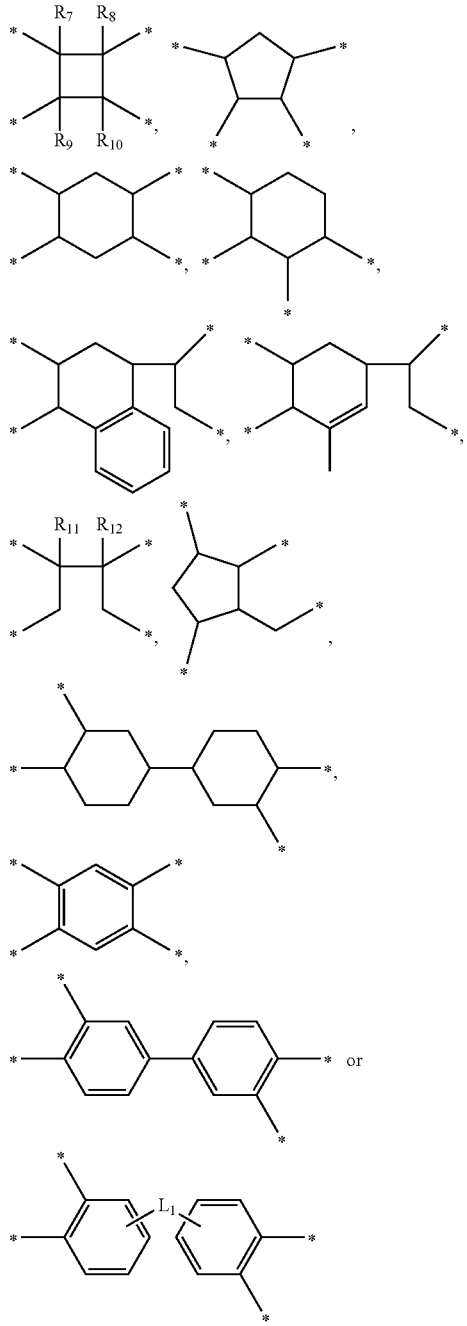

in the Chemical Formulas 1 to 9, at least one of $R_1$ and $R_2$ is a C1-10 alkyl group, and the other is hydrogen; at least one of $R_3$ and $R_4$ is a C1-10 alkyl group, and the other is hydrogen; at least one of $R_5$ and $R_6$ is a C1-10 alkyl group, and the other is hydrogen, and $X^1$ to $X^9$ are each independently, a tetravalent organic group represented by the following Chemical Formula 10, in the Chemical Formula 10, $R_7$ to R are each independently, hydrogen, or a C1-6 alkyl group; $L_1$ is one selected from the group consisting of a single bond, —O—, —CO—, —COO—, —S—, —SO—, —SO$_2$—, —CR$_{13}$R$_{14}$—, —(CH$_2$)$_Z$—, —O(CH$_2$)$_Z$O—, —COO(CH$_2$)$_Z$OCO—, —CONH—, phenylene, or a combination thereof, wherein $R_{13}$ and $R_{14}$ are each independently, hydrogen, a C1-10 alkyl group or fluoroalkyl group; and z is an integer of 1 to 10;

$Y_1$ to $Y_3$ are each independently, a divalent organic group represented by the following Chemical Formula 11,

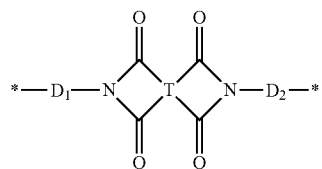

[Chemical Formula 11]

in the Chemical Formula 11, T is the tetravalent organic group represented by the Chemical Formula 10; $D_1$ and $D_2$ are each independently, a C1-20 alkylene group, a C1-10 heteroalkylene group, a C3-20 cycloalkylene group, a C6-20 arylene group, or a C2-20 heteroarylene group, $Y_4$ to $Y_6$ are each independently, a divalent organic group represented by the following Chemical Formula 12,

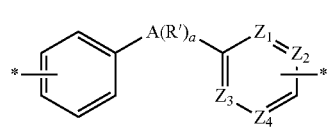

[Chemical Formula 12]

in the Chemical Formula 12, A is a Group 15 element; R' is hydrogen, or a C1-10 alkyl group; a is an integer of 1 to 3, and at least one of $Z_1$ to $Z_4$ is nitrogen, and the others are carbon, $Y_7$ to $Y_9$ are each independently, a divalent organic group represented by the following Chemical Formula 13,

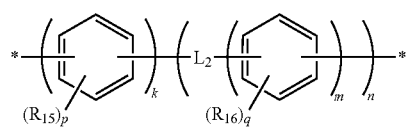

[Chemical Formula 13]

in the Chemical Formula 13, $R_{15}$ and $R_{16}$ are each independently, hydrogen, halogen, cyano, nitrile, C1-10 alkyl, C2-10 alkenyl, C1-10 alkoxy, C1-10 fluoroalkyl, or C1-10 fluoroalkoxy; p and q are each independently, an integer of 0 to 4; $L_2$ is a single bond, —O—, —CO—, —S—, —SO$_2$—, —C(CH$_3$)$_2$—, —C(CF$_3$)$_2$—, —COO—, —(CH$_2$)$_y$—, —O(CH$_2$)$_y$O—, —O(CH$_2$)$_y$—, —NH—, —NH(CH$_2$)$_y$—NH—, —NH(CH$_2$)$_y$O—, —OCH$_2$—C(CH$_3$)$_2$—CH$_2$O—, —COO(CH$_2$)$_y$—OCO—, or —OCO—(CH$_2$)$_y$—COO—; y is an integer of 1 to 10; k and m are each independently, an integer of 0 to 1, and n is an integer of 0 to 3,

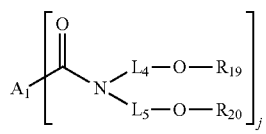

[Chemical Formula 16]

in the Chemical Formula 16, $A_1$ is a mono- to tetravalent functional group; j is an integer of 1 to 4; $L_4$ and $L_5$ are identical to or different from each other, and each independently, a C1-10 alkylene group or a C6-20 arylene group, and $R_{19}$ and $R_{20}$ are each independently, a silicon-containing monovalent functional group.

A method for preparing a liquid crystal alignment film is also provided herein, which method comprises steps of: applying the liquid crystal alignment composition on a substrate to form a coating; drying the coating; irradiating light to the coating or rubbing the coating to progress alignment treatment; and heat treating the alignment-treated coating to cure.

A liquid crystal alignment film comprising the aligned and cured product of the liquid crystal alignment composition, and a liquid crystal display comprising the same are also provided herein.

DETAILED DESCRIPTION OF THE INVENTION

Hereinafter, a liquid crystal alignment composition, a method for preparing a liquid crystal alignment film using the same, and a liquid crystal alignment film and a liquid crystal display using the same according to specific embodiments of the invention will be explained in more detail.

As used herein, when any part "comprises" any constructional element, it does not mean that other constructional elements are excluded, but it means that other constructional elements can be further included, unless described to the contrary.

As used herein, the term "substitution" means that another functional group bonds instead of a hydrogen atom in the compound, and the substituted position is not limited as long as it is a position where a hydrogen atom is substituted, namely, a substituent can be substituted, and in case substituted with two or more substituents, the two or more substituents may be identical to or different from each other.

As used herein, the term "unsubstituted or substituted" means unsubstituted or substituted with one or more substituents selected from the group consisting of deuterium; a halogen group; a cyano group; a nitro group; a hydroxyl group; a carbonyl group; an ester group; an imide group; an amide group; an amino group; a carboxy group; a sulfonic acid group; a sulfone amide group; a phosphine oxide group; an alkoxy group; an aryloxy group; an alkyl thioxy group; an aryl thioxy group; an alkyl sulfonyl group; an aryl sulfonyl group; a silyl group; a boron group; an alkyl group; a cycloalkyl group; an alkenyl group; an aryl group; an aralkyl group; an aralkenyl group; an alkylaryl group; an arylphosphine group; or a heterocyclic group containing one or more selected from N, O and S atoms, or unsubstituted or substituted with a substituent in which two or more of the above described substituents are connected. For example, "a substituent in which two or more substituents are connected" may be a biphenyl group. Namely, a biphenyl group may be an aryl group, or it may be interpreted as a substituent in which two phenyl groups are connected.

As used herein,

or ----* means a bond connected to other substituents, and a direct bond means a case wherein any atom does not exist in a part indicated by L.

An alkyl group may be linear or branched, and the carbon number is not specifically limited, but preferably 1 to 10. According to one embodiment, the carbon number of the alkyl group is 1 to 6. Specific examples of the alkyl group may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cycloheptylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, and the like, but are not limited thereto.

A C1-10 fluoroalkyl group may the C1-10 alkyl group of which one or more hydrogen atoms are substituted with fluorine, and a C1-10 fluoroalkoxy group may be the C1-10 alkoxy group of which one or more hydrogen atoms are substituted with fluorine.

An aryl group is a monovalent functional group derived from arene, for example, a monocyclic aryl group or a polycyclic aryl group. As the monocyclic aryl group, a phenyl group, a biphenyl group, a terphenyl group, a stilbenyl group and the like may be mentioned, but not limited thereto. As the polycyclic aryl group, a naphthyl group, an anthracenyl group, a phenanthryl group, a pyrenyl group, a perylenyl group, a chrysenyl group, a fluorenyl group, and the like may be mentioned, but not limited thereto. One or more hydrogen atoms of the aryl group may be respectively substituted with substituents as in the alkyl group.

Halogen may be fluorine (F), chlorine (Cl), bromine (Br) or iodine (I).

A Group 15 element may be nitrogen (N), phosphorus (P), arsenic (As), antimony (Sb) or bismuth (Bi).

A nitrogen oxide is a compound in which a nitrogen atom and an oxygen atom bond, and a nitrogen oxide functional group means a functional group including nitrogen oxide in the functional group. As the nitrogen oxide functional group, for example, a nitro group ($—NO_2$), and the like may be used.

An alkylene group is a divalent functional group derived from alkane, and the carbon number is 1 to 20, or 1 to 10, or 1 to 5. For example, it may be a linear, branched or cyclic methylene group, ethylene group, propylene group, isobutylene group, sec-butylene group, tert-butylene group, pentylene group, hexylene group, and the like. One or more hydrogen atoms included in the alkylene group may be substituted with a substituent as in the alkyl group.

A heteroalkylene group is an alkylene group containing oxygen (O), nitrogen (N) or sulfur (S) as a heteroatom, the carbon number is 1 to 10, or 1 to 5. For example, it may be oxyalkylene, and the like. One or more hydrogen atoms included in the heteroalkylene group may be substituted with a substituent as in the alkyl group.

A cycloalkylene group is a divalent functional group derived from cycloalkane, and the carbon number is 3 to 20, or 3 to 10. For example, it may be cyclopropylene, cyclobutylene, cyclopentylene, 3-methylcyclopentylene, 2,3-dimethylcyclopentylene, cyclohexylene, 3-methylcyclohexylene, 4-methylcyclohexylene, 2,3-dimethylcyclohexylene, 3,4,5-trimethylcyclohexylene, 4-tert-butylcyclohexylene, cycloheptylene, cyclooctylene, and the like, but is not limited thereto.

An arylene group is a divalent functional group derived from arene, it may be a monocyclic or polycyclic, and the carbon number is 6 to 20, or 6 to 10. For example, it may be a phenylene group, a biphenylene group, a terphenylene group, a stilbenylene group, a naphthylenyl group, and the like, but is not limited thereto. One or more hydrogen atoms included in the arylene group may be substituted with a substituent as in the alkyl group.

A heteroarylene group is an arylene group containing O, N or S as a heteroatom, and the carbon number is 2 to 20, or 2 to 10, or 6 to 20. One or more hydrogen atoms included in the heteroarylene group may be substituted with a substituent as in the alkyl group.

Throughout the specification, weight average molecular weight means weight average molecular weight converted in terms of polystyrene, measured by GPC method. During the process of measuring weight average molecular weight converted in terms of polystyrene measured by GPC, commonly known analysis equipment and detectors such as refractive index detector, and analysis columns may be used, and commonly applied temperature condition, solvent, flow rate may be applied. For example, using Polymer Laboratories PLgel MIX-B 300 mm length column and Waters PL-GPC220 device, at the evaluation temperature of 40° C., using a mixed solvent of dimethylformamide (DMF) and tetrahydrofurane (THF) at a weight ratio of 50 wt %:50 wt %, and at a flow rate of 1 mL/min, a sample is prepared at the concentration of 10 mg/10 mL and then fed in the amount of 200 μL, and using a calibration curve formed using a polystyrene standard, Mw value may be calculated. As the polystyrene standard, 9 kinds having molecular weight of 2,000/10,000/30,000/70,000/200,000/700,000/2,000,000/4,000,000/10,000,000 were used.

The liquid crystal alignment composition according to the present invention is characterized by comprising first liquid crystal alignment polymer, which is partially imidized polyimide precursor, second liquid crystal alignment polymer, which is polyimide precursor derived from diamine of a non-symmetric pyridine structure, and common third liquid crystal alignment polymer together.

In case the existing polyimide is used as a liquid crystal alignment film, a polyimide precursor of polyamic acid or polyamic acid ester was applied and dried to form a coating, followed by high temperature heat treatment to convert into polyimide, which was irradiated by light to progress alignment treatment. However, in order to obtain sufficient liquid crystal alignment property by light irradiation to the polyimide film, high energy of light irradiation is required, and in order to secure alignment stability after light irradiation, an additional heat treatment process should be conducted. The high energy of light irradiation and additional high temperature heat treatment process are very unfavorable in terms of process cost and process time, and thus, there was a limitation in the application for the practical process of mass production.

In order to solve the problem, a liquid crystal alignment composition comprising the first liquid crystal alignment polymer and the third liquid crystal alignment polymer has been developed, so as to prepare a liquid crystal alignment film that can significantly reduce energy of light irradiation by the first polymer, has excellent alignability and stability even by a simple process including single heat treatment process, and also has excellent voltage holding ratio and electrical properties.

However, the present inventors confirmed that if second liquid crystal alignment polymer comprising repeat units of the Chemical Formulas 4 to 6, which is prepared from reactants including a diamine compound of a specific structure containing nitrogen atom, is included in the liquid crystal alignment composition, together with the first liquid crystal alignment polymer and the third liquid crystal alignment polymer, a liquid crystal alignment film prepared therefrom may have high voltage holding ratio even at high temperature, thereby significantly improving electrical properties and stability, contrast ratio decrease or afterimage may be improved, and alignment stability against thermal stress and mechanical strength of the alignment film may be also improved.

The present inventors confirmed through experiments that as in the liquid crystal alignment composition of one embodiment, if in the cross-linking agent compound added together with polyimide or precursor polymer thereof, the end of cross-linkable functional group, i.e., hydroxyl group (—OH) is substituted with specific functional groups of $R_{19}$ and $R_{20}$ as shown in the Chemical Formula 16, the functional groups of $R_{19}$ and $R_{20}$ act as protection groups, thus improving dispersibility in the liquid crystal alignment composition, and alignment property and alignment stability of the finally prepared alignment film may be improved, and completed the present invention.

And, the present inventors confirmed that in case the end of cross-linkable functional group, i.e., a hydroxyl group (—OH) is substituted with the silicon-containing functional groups of $R_{19}$ and $R_{20}$ due to the inclusion of the silicon-containing functional group, compared to the existing cross-linking agent having a hydroxyl (—OH) end, the reactivity of the cross-linking agent during the initial drying process may be reduced, and after light exposure for alignment, a cross-linking reaction begins to reduce initial alignment decrease by the cross-linking agent. It was also confirmed through experiments that during the process of progressing imidization after exposure for alignment, a degree of imidization increases to increase rearrangement degree and alignability, and the present invention was completed.

The functional groups of $R_{19}$ and $R_{20}$ introduced at the end of the cross-linkable functional group of the cross-linking agent compound may inhibit a cross-linking reaction by the cross-linkable functional group, thus minimizing the formation of cross-link structures in the liquid crystal alignment composition, thereby improving stability and reliability of the composition, and when heat treated during drying and baking processes of a liquid crystal alignment film, they are detached and removed at a temperature above about 80° C., and the hydroxyl groups are recovered at the end of the cross-linkable functional group, thus progressing a smooth cross-linking reaction to improve mechanical properties of the alignment film.

Namely, in the liquid crystal alignment composition, the structure of the cross-linking agent compound represented by the Chemical Formula 16 is maintained, and a cross-linking reaction between the cross-linking agent compound represented by the Chemical Formula 16 and polyimide or precursor polymer thereof may be inhibited. And, when a temperature is increased by heat treatment while passing through drying, exposure, curing processes, and the like for preparing a liquid crystal alignment film from the liquid crystal alignment composition, in the cross-linking agent compound represented by the Chemical Formula 16, the functional groups of $R_{19}$ and $R_{20}$ are substituted with hydrogen atoms, and a cross-linking reaction between a cross-linking agent compound represented by the Chemical Formula 18 described below and polyimide or precursor polymer thereof may be progressed.

Thus, the liquid crystal alignment composition of one embodiment may inhibit the cross-linkability of the cross-linking agent compound added in the composition, and thus, dispersibility of the cross-linking agent and polyimide or precursor polymer thereof may be sufficiently improved, and during the preparation process of a liquid crystal alignment film of another embodiment described below, through the cross-linking reaction between the cross-linking agent compound and polyimide or precursor polymer thereof, the strength of the alignment film may be improved, and excellent alignment property and electrical properties may be realized in the finally prepared liquid crystal alignment cell.

1. Liquid Crystal Alignment Composition

According to one embodiment of the invention, a liquid crystal alignment composition is provided, which comprises: first liquid crystal alignment polymer comprising one or more kinds of repeat units selected from the group consisting of repeat units represented by the Chemical Formula 1, repeat units represented by the Chemical Formula 2, and repeat units represented by the Chemical Formula 3; second liquid crystal alignment polymer comprising one or more kinds of repeat units selected from the group consisting of repeat units represented by the Chemical Formula 4, repeat units represented by the Chemical Formula 5, and repeat units represented by the Chemical Formula 6; third liquid crystal alignment polymer comprising one or more kinds of repeat units selected from the group consisting of repeat units represented by the Chemical Formula 7, repeat units represented by the Chemical Formula 8, and repeat units represented by the Chemical Formula 9; and a cross-linking agent compound represented by the Chemical Formula 16.

Specifically, the first liquid crystal alignment polymer may comprise one kind of the repeat units represented by the Chemical Formula 1, the repeat units represented by the Chemical Formula 2, and the repeat units represented by the Chemical Formula 3, or a mixture of two kinds thereof, or a mixture of all the three kinds thereof.

And, the second liquid crystal alignment polymer may comprise one kind of the repeat units represented by the Chemical Formula 4, the repeat units represented by the following Chemical Formula 5, and the repeat units represented by the following Chemical Formula 6, or a mixture of two kinds thereof, or a mixture of all the three kinds thereof.

And, the third liquid crystal alignment polymer may comprise one kind of the repeat units represented by the Chemical Formula 7, the repeat units represented by the following Chemical Formula 8, and the repeat units represented by the following Chemical Formula 9, or a mixture of two kinds thereof, or a mixture of all the three kinds thereof.

Specifically, in the first liquid crystal alignment polymer, the second liquid crystal alignment polymer and the third liquid crystal alignment polymer of the liquid crystal alignment composition according to one embodiment, $X_1$ to $X_9$ may be each independently, a tetravalent organic group represented by the following Chemical Formula 10. The $X_1$ to $X_9$ may be functional groups derived from tetracarboxylic acid anhydride used for the synthesis of polyamic acid, polyamic acid ester, or polyimide.

[Chemical Formula 10]

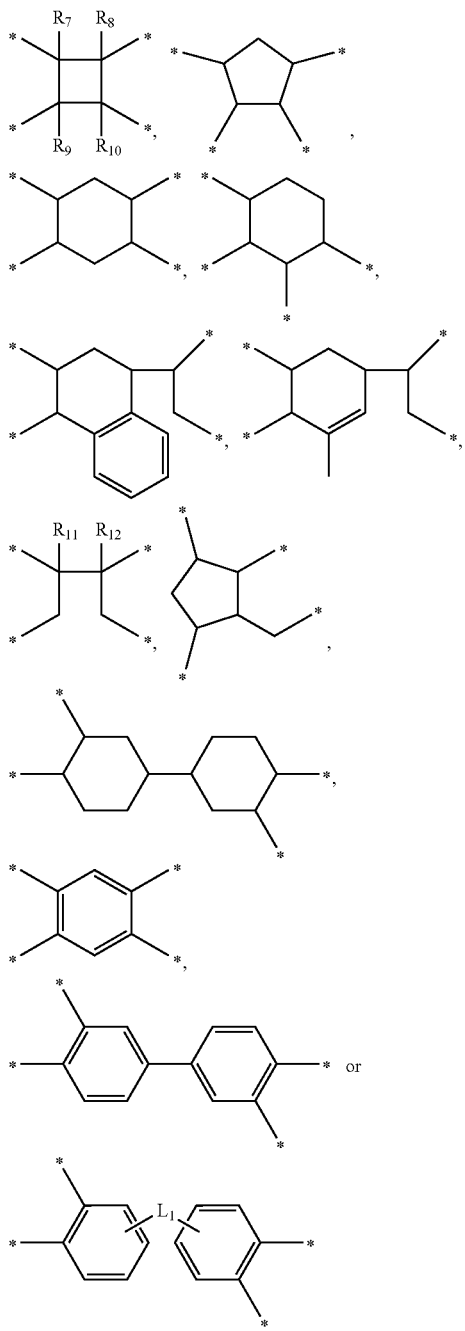

in the Chemical Formula 10, $R_7$ to $R_{12}$ are each independently, hydrogen, or a C1-6 alkyl group; $L_1$ is one selected from the group consisting of a single bond, —O—, —CO—, —COO—, —S—, —SO—, —SO$_2$—, —CR$_{13}$R$_{14}$—, —(CH$_2$)$_z$—, —O(CH$_2$)$_z$O—, —COO(CH$_2$)$_z$OCO—, —CONH—, phenylene, or a combination thereof, wherein $R_{13}$ and $R_{14}$ are each independently, hydrogen, a C1-10 alkyl group or fluoroalkyl group; and z is an integer of 1 to 10, More preferably, the $X_1$ to $X_9$ may be each independently, an organic group of the following Chemical Formula 10-1 derived from 1,2,3,4-tetracarboxylic dianhydride, an organic group of the following Chemical Formula 10-2 derived from 1,3-dimethylcyclobutane-1,2,3,4-tetracarboxylic dianhydride, an organic group of the following Chemical Formula 10-3 derived from tetrahydro-[3,3'-bifurane]-2,2',5,5'-tetraone, an organic group of the following Chemical Formula 10-4 derived from 1,2,4,5-cyclohexane tetracarboxylic dianhydride, an organic group of the following Chemical Formula 10-5 derived from pyromellitic dianhydride, or an organic group of the following Chemical Formula 10-6 derived from 3,3',4,4'-biphenyltetracarboxylic dianhydride.

[Chemical Formula 10-1]

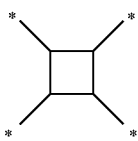

[Chemical Formula 10-2]

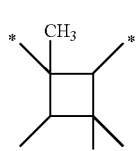

[Chemical Formula 10-3]

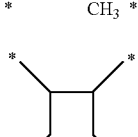

[Chemical Formula 10-4]

[Chemical Formula 10-5]

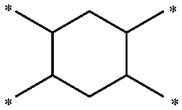

[Chemical Formula 10-6]

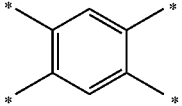

Meanwhile the first liquid crystal alignment polymer of the liquid crystal alignment composition according to one embodiment may comprise repeat units of the Chemical Formulas 1 to 3 wherein $Y_1$ to $Y_3$ are each independently, a divalent organic group represented by the Chemical Formula 11. Since the first liquid crystal alignment polymer is synthesized from diamine containing imide repeat units already imidized, after forming a coating, light may be directly irradiated without high temperature heat treatment to induce anisotropy, and thereafter, heat treatment may be progressed to complete an alignment film, and thus, light irradiation energy may be significantly reduced, and a liquid crystal alignment film that not only has excellent alignment property and stability but also has excellent voltage holding ratio and electrical properties may be prepared even by a simple process comprising single heat treatment process.

Specifically, in the Chemical Formula 11, T may be a functional group represented by the following Chemical Formula 10-1 or a functional group represented by the following Chemical Formula 10-2.

[Chemcial Formula 10-1]

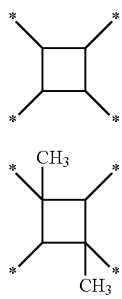

[Chemical Formula 10-2]

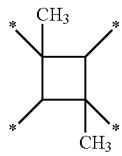

More specifically, although the examples of the organic groups represented by the Chemical Formula 11 are not specifically limited, for example, it may be a functional group represented by the following Chemical Formula 11-1 or Chemical Formula 11-2.

[Chemical Formula 11-1]

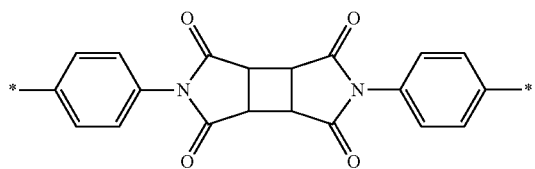

[Chemical Formula 11-2]

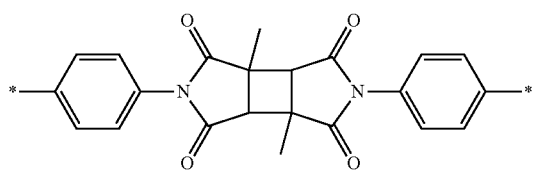

In the first liquid crystal alignment polymer, among the repeat units represented by the Chemical Formula 1, Chemical Formula 2 and Chemical Formula 3, the repeat units represented by the Chemical Formula 1 may be included in the content of 5 mol % to 74 mol %, or 10 mol % to 60 mol %, based on the total repeat units.

As explained above, if polymer comprising a certain amount of imide repeat units represented by the Chemical Formula 1 is used, the first liquid crystal alignment polymer comprises a certain amount of imide repeat units already imidized, and thus, even if light is directly irradiated without high temperature heat treatment, a liquid crystal alignment film having excellent alignment property and stability may be prepared.

If the content of the repeat units represented by the Chemical Formula 1 is less than the above range, sufficient alignment property may not be exhibited, and alignment stability may be lowered, and if the content of the repeat units represented by the Chemical Formula 1 is greater than the above range, it may be difficult to prepare a stable alignment solution that can be coated. Thus, it is preferable that the repeat units represented by the Chemical Formula 1 are included in the above range, so as to provide liquid crystal alignment polymer having excellent storage stability, electrical properties, alignment property and alignment stability.

And, the repeat units represented by the Chemical Formula 2 or the repeat units represented by the Chemical Formula 3 may be included in an appropriate content according to the aimed properties.

Specifically, the repeat units represented by the Chemical Formula 2 may be included in the content of 1 mol % to 60 mol %, preferably 5 mol % to 50 mol %, based on the total repeat units represented by the Chemical Formulas 1 to 3. Since the repeat units represented by the Chemical Formula 2 has low degree of imidization during high temperature heat treatment after light irradiation, if the content is not fall within the above range, the region where it interacts with liquid crystal may decrease, and thus, alignment property may be relatively deteriorated. Thus, the repeat units represented by the Chemical Formula 2 within the above range may provide liquid crystal alignment polymer that has excellent process property and can realize high imidization rate.

And, the repeat units represented by the Chemical Formula 3 may be included in the content of 0 mol % to 95 mol %, preferably 10 mol % to 80 mol %, based on the total repeat units represented by the Chemical Formulas 1 to 3. Within such range, excellent coatability may be exhibited, thus providing liquid crystal alignment polymer that has excellent process property and can realize high imidization rate.

Meanwhile, the second liquid crystal alignment polymer of the liquid crystal alignment composition according to one embodiment may comprise the repeat units of the Chemical Formulas 4 to 6 wherein $Y_4$ to $Y_6$ are each independently, a divalent organic group represented by the Chemical Formula 12. $Y_4$, The $Y_5$, and $Y_6$ may be defined as a divalent organic group represented by the Chemical Formula 12 to provide liquid crystal alignment polymer of various structures that can exhibit the above explained effects.

As explained, since the second liquid crystal alignment polymer is synthesized from diamine containing specific organic functional groups represented by the Chemical Formula 12, high voltage holding ratio may be exhibited even under high temperature environment, and contrast ratio decrease or afterimage may be improved, thereby improving electrical properties.

In the Chemical Formula 12, A may be a Group 15 element, which may be nitrogen (N), phosphorus (P), arsenic (As), tin (Sn) or bismuth (Bi). The R' is a functional group bonding to the A, and it may bond to A element as many as the number represented by a. Preferably, in the Chemical Formula 12, A is nitrogen, R' is hydrogen, and a is 1.

Meanwhile, in the Chemical Formula 12, since at least one of $Z_1$ to $Z_4$ is nitrogen and the others are carbon, the Chemical Formula 12 may form an asymmetric structure by the nitrogen atom wherein symmetry is not made based on the center point or center line. The Chemical Formula 12 is a repeat unit derived from diamine having a specific structure containing nitrogen atom and the like, which is a precursor used for the formation of liquid crystal alignment polymer, and asymmetric diamine described below is used.

The organic group represented by the Chemical Formula 12 has a structural characteristic in that two aromatic cyclic compounds, preferably a hetero aromatic cyclic compound and an aromatic cyclic compound bond by a secondary amine group or a tertiary amine group. Thus, while fulfilling the alignment property or afterimage property required as a liquid crystal alignment agent, voltage holding ratio may be improved to realize excellent electrical properties.

To the contrary, in case two aromatic cyclic compounds bond by a single bond without a secondary amine group or a tertiary amine group, the alignment property of a liquid crystal alignment agent may be poor, and the voltage holding ratio may remarkably decrease.

And, in case each of two aromatic cyclic compounds bonding through a secondary amine group or a tertiary amine group does not include a nitrogen atom, even if an imidization reaction of polyamic acid or polyamic acid ester that is formed by the reaction of amine and acid anhydride is progressed (for example, through 230° C. heat treatment), sufficient imidization reaction may not be progressed, and thus, an imidization rate may decrease in the final liquid crystal alignment film.

And, the organic group represented by the Chemical Formula 12 is characterized in that only an amine group and hydrogen bond to a hetero aromatic cyclic compound and an aromatic cyclic compound, respectively, and other substituents are not introduced. And, in case a substituent, for example, a fluoroalkyl group is introduced in the hetero aromatic cyclic compound or aromatic cyclic compound, the alignment property of a liquid crystal alignment agent may be poor, and a voltage holding ratio may remarkably decrease.

More specifically, in the Chemical Formula 12, one of $Z_1$ to $Z_4$ may be nitrogen, and the others may be carbon, or in the Chemical Formula 12, one of $Z_1$ and $Z_3$ may be nitrogen and the other may be carbon, and $Z_2$ and $Z_4$ may be carbon. Namely, in the Chemical Formula 12, the aromatic ring containing $Z_1$ to $Z_4$ may have a pyridine structure. Thus, a liquid crystal display applying the liquid crystal alignment polymer of one embodiment may realize high voltage holding ratio and liquid crystal alignment property.

And, the Chemical Formula 12 may include one or more kinds of functional groups from the group consisting of the following Chemical Formula 12-1, Chemical Formula 12-2 and Chemical Formula 12-3.

[Chemical Formula 12-1]

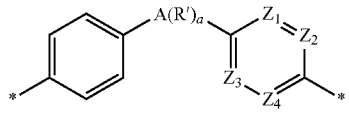

[Chemical Formula 12-2]

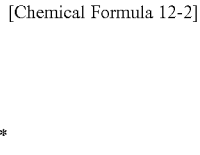

[Chemical Formula 12-3]

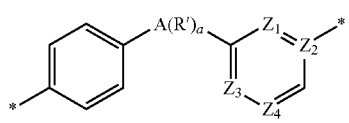

In the Chemical Formulas 12-1 to 12-3, A, $Z_1$ to $Z_4$, R', a are as explained in the Chemical Formula 12.

As explained, when the organic group represented by the Chemical Formula 12 includes one or more divalent functional groups selected from the group consisting of Chemical Formula 12-1, Chemical Formula 12-2, and Chemical Formula 12-3, more excellent liquid crystal alignment property may be realized.

More specifically, although the examples of the organic group represented by the Chemical Formula 12 are not significantly limited, for example, one or more functional groups selected from the group consisting of the following Chemical Formula 12-4, Chemical Formula 12-5 and Chemical Formula 12-6 may be mentioned.

[Chemical Formula 12-4]

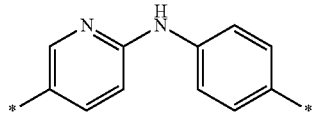

[Chemical Formula 12-5]

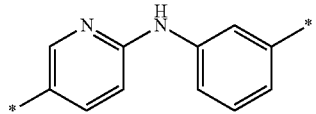

[Chemical Formula 12-6]

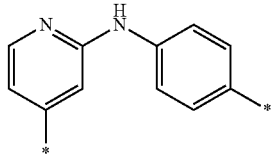

Meanwhile, the in the liquid crystal alignment composition according to one embodiment, the third liquid crystal alignment polymer is represented by the Chemical Formulas 7 to 9, wherein $Y_7$ to $Y_9$ are each independently, a divalent organic group represented by the Chemical Formula 13. By including the third liquid crystal alignment polymer comprising the organic group of the Chemical Formula 13, electrical properties of the alignment film such as voltage holding ratio may be significantly improved, alignability of the liquid crystal alignment film can be increased, and mechanical property can be increased to secure durability of the alignment film.

In the Chemical Formula 13, to carbon that is not substituted with $R_{15}$ or $R_{16}$, hydrogen bonds, and when p or q is an integer of 2 to 4, plural $R_{15}$ or $R_{16}$ may be substituents identical to or different from each other. And, in the Chemical Formula 13, k and m may be each independently, an integer of 0 to 1, and n may be an integer of 0 to 3, or 0 or 1.

More specifically, although the examples of the Chemical Formula 13 are not specifically limited, for example, it may be a functional group represented by the following Chemical Formula 14 or Chemical Formula 15.

[Chemical Formula 14]

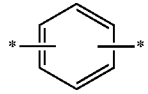

[Chemical Formula 15]

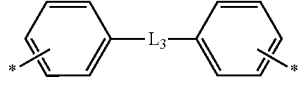

In the Chemical Formula 15, $L_3$ is a single bond, —O—, —SO$_2$—, —O(CH$_2$)$_y$O— or —CR$_{17}$R$_{18}$—, wherein y is an integer of 1 to 10, and R$_{17}$ and R$_{18}$ are each independently, hydrogen, or C1-10 alkyl.

Preferably, the Chemical Formula 14 may be the following Chemical Formula 14-1.

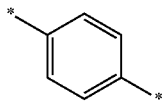
[Chemical Formula 14-1]

And, the Chemical Formula 15 may be the following Chemical Formula 15-1.

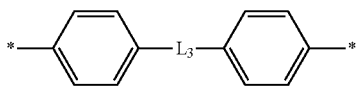
[Chemical Formula 15-1]

In the Chemical Formula 15-1, $L_3$ is —O—, —O$(CH_2)_2$O— or —$CH_2$—.

Meanwhile, the liquid crystal alignment composition according to one embodiment may comprise the second liquid crystal alignment polymer in the content of 10 parts by weight to 1000 parts by weight, or 15 parts by weight to 800 parts by weight, based on 100 parts by weight of the first liquid crystal alignment polymer.

If the first liquid crystal alignment polymer and the second liquid crystal alignment polymer are used at the above weight ratio range, excellent photoreaction property and liquid crystal alignment property of the first liquid crystal alignment polymer and excellent electrical properties of the second liquid crystal alignment polymer may be complemented with each other, and thus, excellent coatability may be exhibited to realize excellent process property as well as high imidization degree, and a liquid crystal alignment film having excellent electrical properties such as afterimage generated by direct current/alternating current voltage and voltage holding ratio, and simultaneously having more excellent alignment property and mechanical durability can be prepared.

And, the liquid crystal alignment composition according to one embodiment may comprise the third liquid crystal alignment polymer in the content of 10 parts by weight to 1000 parts by weight, or 15 parts by weight to 800 parts by weight, based on 100 parts by weight of the first liquid crystal alignment polymer.

Thus, if the first liquid crystal alignment polymer, the second liquid crystal alignment polymer and the third liquid crystal alignment polymer are mixed in the above weight ratio range, excellent photoreaction property and liquid crystal alignment property of the first liquid crystal alignment polymer, excellent electrical properties of the second liquid crystal alignment polymer, and alignability and mechanical property of the third liquid crystal alignment polymer may be complemented with each other, and thus, excellent coatability may be exhibited, thereby realizing excellent process property and high imidization degree, and a liquid crystal alignment film that has excellent electrical properties such as afterimage generated by direct current/alternating current voltage, voltage holding ratio, and the like, and simultaneously has excellent alignment property and improved mechanical durability may be prepared.

Although the weight average molecular weight (measured by GPC) of the first liquid crystal alignment polymer, the second liquid crystal alignment polymer and the third liquid crystal alignment polymer is not significantly limited, for example, it may be 10000 g/mol to 200000 g/mol.

2. Cross-Linking Agent Compound

The liquid crystal alignment composition of one embodiment may comprise a cross-linking agent compound, in addition to the above explained polymer, and the cross-linking agent compound according to the present invention may have a specific chemical structure represented by the above Chemical Formula 16. The physical/chemical properties of the cross-linking agent compound seem to be derived from the above explained specific structure of the Chemical Formula 16.

In the Chemical Formula 16, $A_1$ is a mono- to tetravalent functional group, and j is an integer of 1 to 4. The $A_1$ is a functional group positioned at the center of the cross-linking agent compound, and to the end functional groups included in $A_1$, functional groups indicated by "[ ]" in the Chemical Formula 10 may bond as many as j.

Namely, in the Chemical Formula 16, if j is 1, $A_1$ is a monovalent functional group. And, if j is 2, $A_1$ is a divalent functional group. And, if j is 3, $A_1$ is a trivalent functional group. And, if j is 4, $A_1$ is a tetravalent functional group. Preferably, in the Chemical Formula 16, j is 2, and $A_1$ may be a C1-10 alkylene group, specifically, a butylene group.

In the Chemical Formula 16, $L_4$ and $L_5$ are identical to or different from each other, and each independently, a C1-10 alkylene group or a C6-20 arylene group, and preferably, $L_4$ and $L_5$ are each independently, a C1-5 alkylene group, for example, an ethylene group.

In the Chemical Formula 16, $R_{19}$ and $R_{20}$ are functional groups substituted for a hydrogen atom at the end of the cross-linkable functional group of the cross-linking agent compound, i.e., hydroxyl group (—OH), and they may inhibit the cross-linking reaction between polyimide or precursor polymer thereof and the cross-linking agent compound represented by the Chemical Formula 16.

As described below, the $R_{19}$ and $R_{20}$ may be substituted with a hydrogen atom and detached when a temperature increases above 80° C., while passing through a drying process, an exposure process, and a curing process for preparing a liquid crystal alignment film from the liquid crystal alignment composition.

The $R_{19}$ and $R_{20}$ are each independently, the silicon-containing monovalent functional group.

Specifically, the silicon-containing monovalent functional group may be a functional group represented by the following Chemical Formula 17:

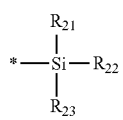
[Chemical Formula 17]

In the Chemical Formula 17, $R_{21}$, $R_{22}$ and $R_{23}$ are each independently, hydrogen, or C1-10 alkyl.

More specifically, in the Chemical Formula 17, $R_{21}$, $R_{22}$ and $R_{23}$ may be C1-10 alkyl, preferably, a methyl group.

In the Chemical Formula 16, $A_1$ may be a C1-10 alkylene, and j may be 2. Namely, the cross-linking agent compound represented by the Chemical Formula 16 may include a compound represented by the following Chemical Formula 16-1.

[Chemical Formula 16-1]

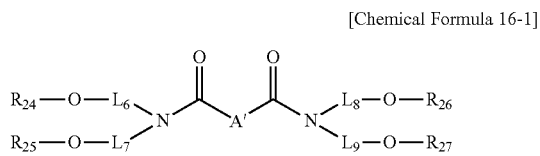

In the Chemical Formula 16-1, $A_1$ is a C1-10 alkylene group, $L_6$ to $L_9$ are each independently, a C1-5 alkylene, and $R_{24}$ to $R_{27}$ are each independently, the silicon-containing monovalent functional group.

More specifically, the example of the cross-linking agent compound represented by the Chemical Formula 16-1 may include a compound represented by the following Chemical Formula 16-2 wherein A' is a butylene group having 4 carbon, all of $L_6$ to $L_9$ are ethylene groups having 2 carbon, and all of $R_{24}$ to $R_{27}$ are functional groups represented by the Chemical Formula 17 ($R_{21}$, $R_{22}$ and $R_{23}$ are methyl groups).

[Chemical Formula 16-2]

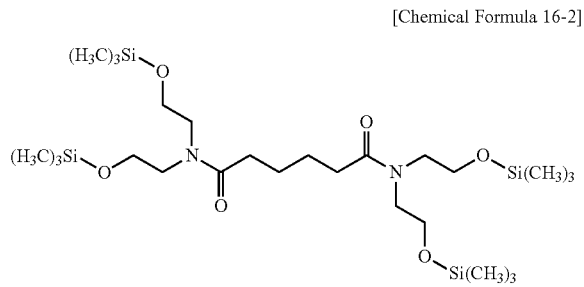

And, another example of the cross-linking agent compound represented by the Chemical Formula 16-1 may include a compound represented by the following Chemical Formula 16-3 wherein A' is a butylene group having 4 carbon, all of $L_6$ to $L_9$ are ethylene groups having 2 carbon, and all of $R_{24}$ to $R_{27}$ are functional groups represented by the Chemical Formula 17 ($R_{21}$, $R_{22}$ and $R_{23}$ are ethyl groups).

[Chemical Formula 16-3]

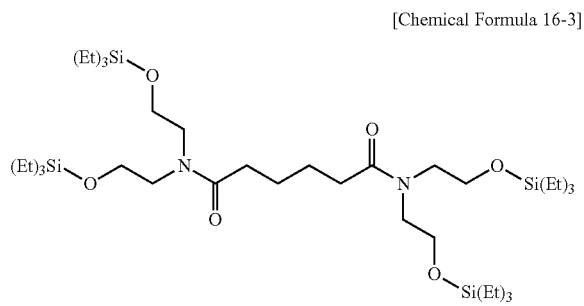

The cross-linking agent compound represented by the Chemical Formula 16 may be included in the content of 1 wt % to 30 wt %, or 2 wt % to 25 wt %, or 3 wt % to 25 wt %, or 5 wt % to 10 wt % based on the total weight of the liquid crystal alignment composition. If the content of the cross-linking agent compound excessively increases, the cross-linking degree of the liquid crystal alignment polymer may excessively increase, thus decreasing flexibility of the polymer, and due to increase in the viscosity of the composition, storage stability may decrease and gelation may occur in the composition, thus decreasing coatability on a substrate.

To the contrary, if the content of the cross-linking agent compound excessively decreases, it may be difficult to sufficiently realize the effect for improving mechanical strength and electrical properties by increasing the cross-linking degree of the liquid crystal alignment polymer.

3. A Method for Preparing a Liquid Crystal Alignment Film

According to another embodiment of the invention, a method for preparing a liquid crystal alignment film using the liquid crystal alignment composition is provided, which method comprises steps of: applying the liquid crystal alignment composition on a substrate to form a coating (step 1); drying the coating (step 2); irradiating light to the coating or rubbing the coating to progress alignment treatment (step 3); and heat treating the alignment-treated coating to cure (step 4).

In the step 1, the above explained liquid crystal alignment composition is applied on a substrate to form a coating. The details of the liquid crystal alignment composition include all the contents described in the above embodiment.

A method of applying the liquid crystal alignment composition on a substrate is not specifically limited, and for example, screen printing, offset printing, flexo printing, ink jet, and the like may be used.

And, the liquid crystal alignment composition may be dissolved or dispersed in an organic solvent. Specific examples of the organic solvent may include N,N-dimethylforamide, N,N-dimethylacetamide, N-methyl-2-pyrrolidone, N-methylcaprolactone, 2-pyrrolidone, M-ethylpyrrolidone, N-vinylpyrrolidone, dimethylsulfoxide, tetratmethylurea, pyridine, dimethylsulfone, hexamethylsulfoxide, γ-butyrolactone, 3-methoxy-N,N-dimethylpropaneamide, 3-ethoxy-N,N-dimethylpropaneamide, 3-buthoxy-N,N-dimethylpropaneamide, 1,3-dimethyl-imidazolidinone, ethylamylketone, methylnonylketone, methylethylketone, methylisoamylketone, methylisopropylketone, cyclohexanone, ethylenecarbonate, propylenecarbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. These may be used alone or in combinations.

And, the liquid crystal alignment composition may further comprise other components, in addition to the organic solvent. As non-limiting examples, additives that can improve the uniformity of a film thickness or surface smoothness, improve adhesion of a liquid crystal alignment film and a substrate, change dielectric constant or conductivity of a liquid crystal alignment film, or increase denseness of a liquid crystal alignment film when the liquid crystal alignment composition is applied, may be additionally included. As such additives, various solvents, surfactants, silane-based compounds, dielectric substances or cross-linkable compounds, and the like may be mentioned.

In the step 2, the coating formed by applying the liquid crystal alignment composition on a substrate is dried.

The step of drying the coating may be conducted by heating, vacuum evaporation of the coating, and the like, and it may be preferably conducted at 50° C. to 150° C., or 60° C. to 140° C.

In the step 3, light is irradiated to the coating to progress alignment treatment.

In the alignment treatment step, the coating may be a coating immediately after the drying step, or it may be a coating passing through heat treatment after the drying step. The "coating immediately after the drying step" means that light is immediately irradiated without progressing heat treatment to a temperature above the drying step, after the drying step, and other steps except heat treatment may be added.

More specifically, the existing method for preparing a liquid crystal alignment film using a liquid crystal alignment agent containing polyamic acid or polyamic acid ester essentially comprises a step of progressing high temperature heat treatment before light irradiation for the imidization of polyamic acid, while according to the method for preparing a liquid crystal alignment film using the liquid crystal alignment agent of the above embodiment, the heat treatment step is not included, and light is immediately irradiated to progress alignment treatment, and then, the alignment-treated coating is heat treated and cured, thereby preparing a alignment film.

And, in the step of alignment treatment, light irradiation may be conducted by irradiating polarized UV rays of 150 nm to 450 nm wavelength, Wherein, the intensity of light exposure may vary according to the kind of liquid crystal alignment polymer, and it may be 10 mJ/cm$^2$ to 10 J/cm$^2$, preferably 30 mJ/cm$^2$ to 2 J/cm$^2$.

Wherein, UV rays polarized by passing through or reflecting on a polarization device in which dielectric anisotropic material is coated on the surface of a transparent substrate such as quartz glass, soda lime glass, soda lime free glass, and the like, a polarization plate on which aluminum or metal wire is finely deposited, or a Brewster polarization device using reflection of quartz glass, and the like may be irradiated to progress alignment treatment. The polarized UV rays may be irradiated vertically to the surface of the substrate, or may be irradiated at an incident angle inclined at a specific angle. In this way, the alignability of liquid crystal molecules is imparted to the coating.

And, in the step of alignment treatment, rubbing may be conducted using rubbing cloth. More specifically, the rubbing treatment may be conducted by rubbing the surface of the heat-treated coating in one direction while rotating a rubbing roller having rubbing cloth attached to a metal roller In the step 4, the alignment-treated coating is heat treated to cure.

In the step of heat treating the alignment-treated coating to cure, in the alignment-treated coating, the functional groups $R_{19}$ and $R_{20}$ of the cross-linking agent compound represented by the Chemical Formula 16 may be substituted with hydrogen atoms and detached, and a cross-linking reaction between the cross-linking agent compound, and polymer comprising polyamic acid repeat units, polyamic acid ester repeat units, polyimide repeat units or a mixture thereof may be progressed.

Specifically, in the step of heat treating the alignment-treated coating to cure, a cross-linking agent compound represented by the following Chemical Formula 18 may be included in the alignment-treated coating.

[Chemical Formula 18]

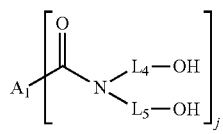

In the Chemical Formula 18, $A_1$, j, $L_4$ and $L_5$ are as defined in the Chemical Formula 16.

In case the cross-linking agent compound represented by the Chemical Formula 18 is included in the liquid crystal alignment composition, a cross-linking reaction may be partially progressed in the composition, and thus, it may be difficult for the cross-linking agent compound to be uniformly dispersed in the composition.

To the contrary, in the liquid crystal alignment composition of the present invention, a cross-linking agent compound represented by the Chemical Formula 16 is added to inhibit a cross-linking reaction in the composition, and then, in the drying step for preparing a liquid crystal alignment film, the cross-linking agent compound represented by the Chemical Formula 16 may be spontaneously converted into the cross-linking agent compound represented by the Chemical Formula 18. Thus, the dispersibility and stability of the cross-linking agent compound in the composition may be increased, and the effect for improving film strength may be realized through the formation of cross-link structures in the alignment film.

The step of heat treating the alignment-treated coating to cure is also conducted after light irradiation in the existing method of preparing a liquid crystal alignment film using liquid crystal alignment polymer containing polyamic acid or polyamic acid ester, and it is distinguished from the heat treatment step conducted before light irradiation, or conducted for the imidization of a liquid crystal alignment agent while irradiating light, after applying a liquid crystal alignment agent on a substrate.

Wherein, the heat treatment may be conducted by heating means such as a hot plate, a hot air circulating furnace, an infrared heater, and the like, and it may be preferably conducted at 150 to 300° C., or 200 to 250° C.

Meanwhile, after the step of drying the coating (step 2), if necessary, a step of heat treating the dried coating to a temperature above the temperature of the drying step may be further included. The heat treatment may be conducted by a hot plate, a hot air circulating furnace, an infrared heater, and the like, and preferably at 150° C. to 250° C. During this process, the liquid crystal alignment agent may be imidized.

Namely, the method for preparing a liquid crystal alignment film may comprise: applying the above explained liquid crystal alignment agent on a substrate to form a coating (step 1); drying the coating (step 2); heat treating the dried coating to a temperature above the temperature of the drying step (step 3); irradiating light to the heat treated coating or rubbing the heat treated coating to progress alignment treatment (step 4); and heat treating the alignment-treated coating to cure (step 5).

4. Liquid Crystal Alignment Film

Meanwhile, according to yet another embodiment of the invention, a liquid crystal alignment film prepared according to the above explained method for preparing a liquid crystal alignment film is provided. Specifically, the liquid crystal alignment film may comprise the aligned and cured product of the liquid crystal alignment composition of one embodiment. The aligned and cured product means a product obtained through the alignment process and curing process of the liquid crystal alignment composition of one embodiment.

As explained, if a liquid crystal alignment composition comprising the first liquid crystal alignment polymer, the second liquid crystal alignment polymer; the third liquid crystal alignment polymer; and the cross-linking agent compound represented by the Chemical Formula 16 is used, a liquid crystal alignment film having improved stability and exhibiting excellent electrical properties can be prepared.

Specifically, the liquid crystal alignment film may have film strength calculated by the following Mathematical Formula 1, of 5% or less, or 0.1% to 5%, or 0.1% to 2%, or 1% to 2%.

Film strength=haze of liquid crystal alignment film after rubbing treatment−haze of liquid crystal alignment film before rubbing treatment [Mathematical Formula 1]

The rubbing treatment of the liquid crystal alignment film may be conducted by rubbing the surface of the alignment film using rubbing machine of Sindo Engineering while rotating at 1000 rpm, and the haze value may be measured using a hazemeter.

Although the thickness of the liquid crystal alignment film is not specifically limited, for example, it may be controlled within 0.01 μm to 1000 μm, for example, 0.01 μm to 0.3 μm. If the thickness of the liquid crystal alignment film increase or decreases by a specific numerical value, the properties measured in the liquid crystal alignment film may be also changed as much as the numerical value.

5. Liquid Crystal Display

And, according to yet another embodiment of the invention, a liquid crystal display comprising the above explained liquid crystal alignment film is provided.

The liquid crystal alignment film may be introduced in a liquid crystal cell by known methods, and the liquid crystal cell may be also introduced in the liquid crystal display by known methods. The liquid crystal alignment film is prepared from the liquid crystal alignment composition of another embodiment to realize excellent stability as well as excellent properties. Specifically, it can provide a liquid crystal display that has high voltage holding ratio at high temperature and low frequency, and thus, has excellent electrical properties, in which contrast ratio deterioration or image sticking (afterimage) is decreased, and of which film strength is also excellent.

Specifically, the liquid crystal alignment display may have a voltage holding ratio (VHR) measured at 1V, 1 Hz, 60° C. using 6254C device of TOYO corporation, of 70% or more, or 70% to 99%, or 75% to 99%, or 76% to 96%. If the voltage holding ratio of the liquid crystal alignment display, measured at 1V, 1 Hz, 60° C. using 6254C device of TOYO corporation decreases to less than 70%, it may be difficult to realize a liquid crystal display having high quality driving property at low power.

And, the liquid crystal display may have luminance change rate of less than 5%, said luminance change rate being measured as follows. To the upper and lower substrates, polarization plates are attached perpendicularly to each other. It is placed on a backlight of 7,000 cd/m², and the initial luminance (L0) in the state of black and the later luminance (L$_1$) in the state of black after driving at room temperature, alternating voltage of 7V for 120 hours are observed using PR-788 equipment. And, a difference between the initial luminance (L0) and the later luminance (L$_1$) is divided by the initial luminance (L0) and multiplied by 100, thus calculating luminance change rate.

Advantageous Effects

According to the present invention, a liquid crystal alignment composition for preparing a liquid crystal alignment film having improved alignment property and stability and exhibiting excellent electrical properties, a method for preparing a liquid crystal alignment film using the same, and a liquid crystal alignment film and a liquid crystal display using the same, are provided.

DETAILED DESCRIPTION OF THE EMBODIMENTS

The present invention will be explained in more detail in the following examples. However, these examples are presented only as the illustrations of the present invention, and the contents of the present invention are not limited thereby.

Preparation Example

Preparation Example 1: Preparation of Diamine DA1-1

It was prepared as shown in the following Reaction Scheme.

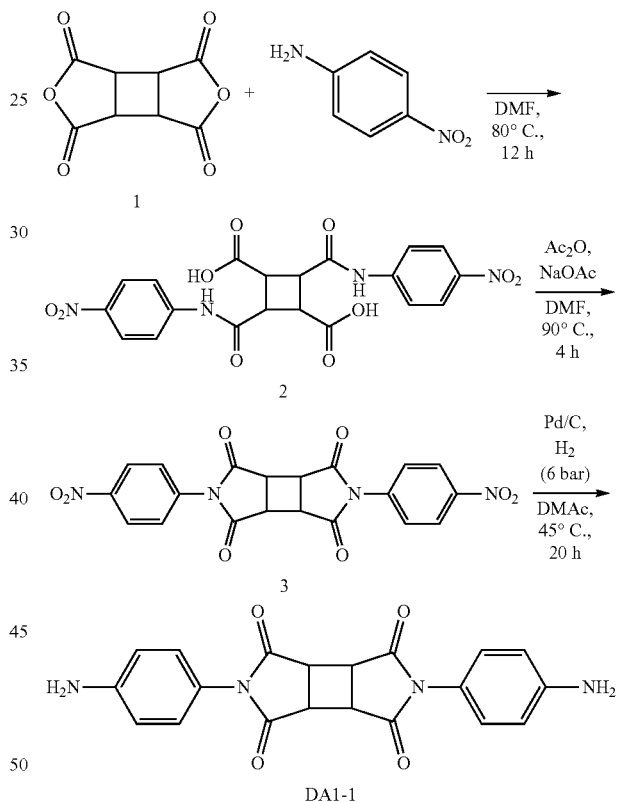

Specifically, CBDA (cyclobutane-1,2,3,4-tetracarboxylic dianhydride, compound 1) and 4-nitroaniline were dissolved in DMF (Dimethylformamide) to prepare a mixture. Subsequently, the mixture was reacted at about 80° C. for about 12 hours to prepare amic acid of the compound 2. Thereafter, the amic acid was dissolved in DMF, and acetic anhydride and sodium acetate were added to prepare a mixture. Subsequently, the amic acid included in the mixture was imidized at about 90° C. for about 4 hours to obtain the compound 3. The obtained imide of the compound 3 was dissolved in DMAc (Dimethylacetamide), and then, Pd/C was added to prepare a mixture. It was reduced at about 45° C. under hydrogen pressure of about 6 bar for about 20 hours to prepare diamine DA1-1.

Preparation Example 2: Preparation of Diamine DA1-2

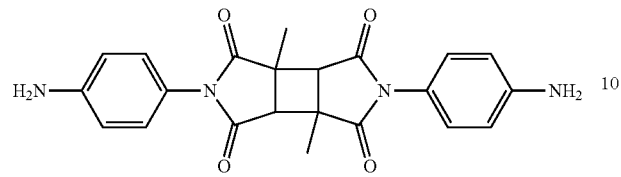

DA1-2

DA1-2 having the above structure was prepared by the same method as Preparation Example 1, except that DMCBDA (1,3-dimethylcyclobutane-1,2,3,4-tetracarboxylic dianhydride) was used instead of CBDA (cyclobutane-1,2,3,4-tetracarboxylic dianhydride).

Preparation Example 3: Synthesis of Diamine DA2

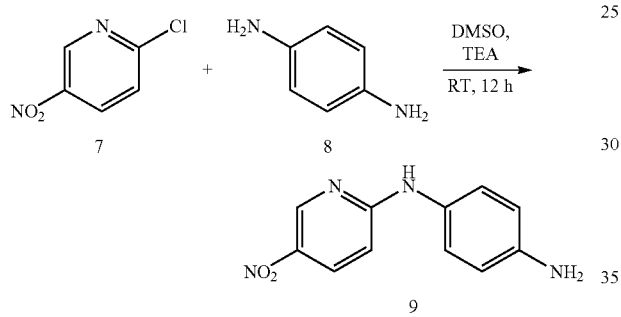

18.3 g (100 mmol) of 2-chloro-5-nitropyridine (compound 7), and 12.5 g (98.6 mmol) of paraphenylenediamine (p-PDA, compound 8) were completely dissolved in about 200 mL of dimethylsulfoxide (DMSO), and then, 23.4 g (200 mmol) of trimethylamine (TEA) was added, and the mixture was stirred at room temperature for about 12 hours. After the reaction was completed, the reaction product was introduced into a container containing about 500 mL of water, and stirred for about 1 hour. It was filtered to obtain solid, which was washed with about 200 mL of water and about 200 mL of ethanol to synthesize 16 g (61.3 mmol) of the compound 9 (yield: 60%).

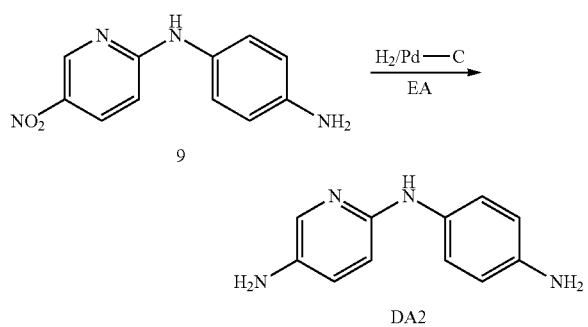

The compound 9 was dissolved in about 200 ml of a 1:1 mixed solution of ethyl acetate (EA) and THF, and then, 0.8 g of palladium (Pd)/carbon (C) was introduced, and the mixture was stirred under hydrogen environment for about 12 hours. After the reaction was completed, the reaction product was filtered through a celite pad, and the filtrate was concentrated to prepare 11 g of the diamine compound DA2-1 (pIDA) (yield: 89%).

Preparation Example 4: Preparation of a Cross-Linking Agent

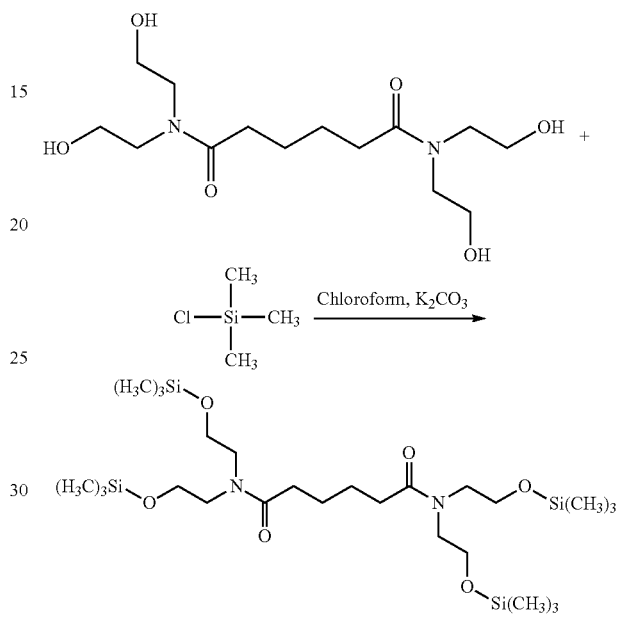

5 g (15.6 mmol) of N,N,N',N'-Tetrakis (2-hydroxyethyl) adipamide) and 10.2 g (94 mmol) of chlorotrimethylsilane were introduced into 150 ml of chloroform, and then, 17.3 g (125 mmol) of potassium carbonate ($K_2CO_3$) was added, and the mixture was stirred at 0° C. under nitrogen environment for 10 hours. After the reaction was completed, the reaction product was filtered through a celite pad, and the filtrate was concentrated to prepare 7.3 g (yield 77%) of N1,N1,N6,N6-tetrakis(2-(trimethylsilyloxy)ethyl)adipamide).

Comparative Preparation Example 1: Preparation of a Cross-Linking Agent

The reactant of Preparation Example 4, N,N,N',N'-Tetrakis(2-hydroxyethyl)adipamide was used as the cross-linking agent of Comparative Preparation Example 1.

Synthesis Example

Using the reactants described in the following Table 1, first polymer, second polymer and third polymer were synthesized. Specific synthesis conditions of Synthesis Examples 1 to 8 were described in the following Table 1.

TABLE 1

| first polymer | Synthesis Example | Diamine Preparation | Acid anhydride |
|---|---|---|---|
| | Synthesis Example 1 (P-1) | Preparation Example 1 (DA1-1) | DMCBDA |
| | Synthesis Example 2 (P-2) | Preparation Example 2 (DA1-2) | DMCBDA |

TABLE 1-continued

| | | Diamine | Acid anhydride |
|---|---|---|---|
| second polymer | Synthesis Example Synthesis Example 3 (Q-1) | Diamine Preparation Example 3 (DA2) | Acid anhydride BT-100 |
| | Synthesis Example 4 (Q-2) | Preparation Example 3 (DA2) | CHDA |
| | Synthesis Example 5 (Q-3) | Preparation Example 3 (DA2) | PMDA |
| Third polymer | Synthesis Example Synthesis Example 6 (R-1) | Diamine ODA | Acid anhydride BPDA |
| | Synthesis Example 7 (R-2) | EODA | BPDA |
| | Synthesis Example 8 (R-3) | MDA | BPDA |

Synthesis Examples 1 to 2: Synthesis of First Polymer

Synthesis Example 1: Preparation of Liquid Crystal Alignment Polymer P-1

5.0 g (13.3 mmol) of DA1-1 prepared in Preparation Example 1 was completely dissolved in 71.27 g of anhydrous N-methyl pyrrolidone (NMP). And, under an ice bath, 2.92 g (13.03 mmol) of 1,3-dimethyl-cyclobutane-1,2,3,4-tetracarboxylic dianhydride (DMCBDA) was added to the solution, and the mixture was stirred at room temperature for about 16 hours to prepare liquid crystal alignment polymer P-1.

As the result of confirming the molecular weight of the polymer P-1 by GPC, the number average molecular weight (Mn) was 15500 g/mol, and the weight average molecular weight (Mw) was 31000 g/mol And, the monomer structure of the polymer P-1 is determined by the equivalent ratio of monomers used, wherein the rate of imide structures in the molecule was 50.5%, and the rate of amic acid structures was 49.5%.

Synthesis Example 2: Preparation of Liquid Crystal Alignment Polymer P-2

5.376 g of DA1-2 prepared in Preparation Example 2 was dissolved in 74.66 g of NMP, and then, 2.92 g of 1,3-dimethyl-cyclobutane-1,2,3,4-tetracarboxylic dianhydride (DMCBDA) was added, and the mixture was stirred at room temperature for about 16 hours. Thereafter, polymer P-2 was prepared by the same method as Synthesis Example 1.

As the result of confirming the molecular weight of the polymer P-2 by GPC, number average molecular weight (Mn) was 17,300 g/mol, and weight average molecular weight (Mw) was 34,000 g/mol And, in the polymer P-2, the rate of imide structures was 50.5%, and the rate of amic acid structures was 49.5%.

Synthesis Examples 3 to 5: Synthesis of Second Polymer

Synthesis Example 3: Liquid Crystal Alignment Polymer Q-1

21.735 g (0.109 mmol) of diamine prepared in Preparation Example 3, DA2 was completely dissolved in 236.501 g of anhydrous N-methyl pyrrolidone (NMP)

And, under an ice bath, 20.0 g (0.101 mmol) of tetrahydro-[3,3'-bifuran]-2,2',5,5'-tetraone (BT100) was added to the solution, and the solution was stirred at room temperature for about 16 hours to prepare liquid crystal alignment polymer Q-1. As the result of confirming the molecular weight of the polymer Q-1 by GPC, weight average molecular weight (Mw) was 26,400 g/mol.

Synthesis Example 4: Preparation of Liquid Crystal Alignment Polymer Q-2

19.211 g (0.096 mmol) of diamine prepared in Preparation Example 3, DA2 was completely dissolved in 222.194 g of anhydrous N-methyl pyrrolidone (NMP)

And, under an ice bath, 20.0 g (0.089 mmol) of 1,2,4,5-cyclohexanetetracarboxylic dianhydride (CHDA) was added to the solution, and the solution was stirred at room temperature for about 16 hours to prepare liquid crystal alignment polymer Q-2. As the result of confirming the molecular weight of the polymer Q-2 by GPC, weight average molecular weight (Mw) was 24,000 g/mol.

Synthesis Example 5: Preparation of Liquid Crystal Alignment Polymer Q-3

19.743 g (0.099 mmol) of diamine prepared in Preparation Example 3, DA2 was completely dissolved in 225.213 g of anhydrous N-methyl pyrrolidone (NMP) And, under an ice bath, 20.0 g (0.092 mmol) of pyromellitic dianhydride (PMDA) was added to the solution, and the solution was stirred at room temperature for about 16 hours to prepare liquid crystal alignment polymer Q-3. As the result of confirming the molecular weight of the polymer Q-3 by GPC, weight average molecular weight (Mw) was 27,000 g/mol.

Synthesis Examples 6 to 8: Synthesis of Third Polymer

Synthesis Example 6: Liquid Crystal Alignment Polymer R-1

14.636 g (0.073 mol) of 4,4'-oxydianiline (ODA) was completely dissolved in 196.271 g of anhydrous N-methyl pyrrolidone (NMP).

And, under an ice bath, 20.0 g (0.068 mol) of 3,3',4,4'-biphenyl tetracarboxylic acid dianhydride (BPDA) was added to the solution, and the solution was stirred at room temperature for about 16 hours to prepare liquid crystal alignment polymer R-1. As the result of confirming the molecular weight of the polymer R-1 by GPC, weight average molecular weight (Mw) was 27,000 g/mol.

Synthesis Example 7: Liquid Crystal Alignment Polymer R-2

17.856 g (0.073 mol) of 4,4'-(ethane-1,2-diylbis(oxy)) dianiline (EODA) was completely dissolved in 214.516 g of anhydrous N-methyl pyrrolidone (NMP)

And, under an ice bath, 20.0 g (0.068 mol) of 3,3',4,4'-biphenyl tetracarboxylic acid dianhydride (BPDA) was added to the solution, and the solution was stirred at room temperature for about 16 hours to prepare liquid crystal alignment polymer R-2. As the result of confirming the molecular weight of the polymer R-2 by GPC, weight average molecular weight (Mw) was 28,300 g/mol.

Synthesis Example 8: Liquid Crystal Alignment Polymer R-3

14.492 g (0.073 mol) of 4,4'-methylenedianiline (MDA) was completely dissolved in 195.455 g of anhydrous N-methyl pyrrolidone (NMP)

And, under an ice bath, 20.0 g (0.068 mol) of 3,3',4,4'-biphenyl tetracarboxylic acid dianhydride (BPDA) was added to the solution, and the solution was stirred at room temperature for about 16 hours to prepare liquid crystal alignment polymer R-3. As the result of confirming the molecular weight of the polymer R-3 by GPC, weight average molecular weight (Mw) was 23,700 g/mol.

Examples and Comparative Examples: Preparation of Liquid Crystal Alignment Compositions

Example 1: Preparation of a Liquid Crystal Alignment Composition

In a mixed solvent of NMP, GBL, and 2-buthoxyethanol, the first polymer, the second polymer and the third polymer were dissolved in the composition as described in the following Table 2. And, to the solution, N1,N1,N6,N6-tetrakis(2-(trimethylsilyloxy)ethyl)adipamide obtained in Preparation Example 4 was added in the content of 5 wt %, based on the total solution, and then, the mixture was stirred at 25° C. for 16 hours. It was filtered under pressure with a filter made of poly(tetrafluoroethylene) having a pore size of 0.1 μm to prepare a liquid crystal alignment composition.

Example 2: Preparation of a Liquid Crystal Alignment Composition

The liquid crystal alignment composition was prepared by the same method as Example 1, except that the cross-linking agent was added in the content of 10 wt %, based on the total solution, with the composition as described in the following Table 2.

Comparative Example 1: Preparation of a Liquid Crystal Alignment Composition The liquid crystal alignment composition was prepared by the same method as Example 1, except that the cross-linking agent of Preparation Example 4 was not added.

Comparative Example 2: Preparation of Liquid Crystal Alignment Composition

The liquid crystal alignment composition was prepared by the same method as Example 1, except that N,N,N',N'-Tetrakis(2-hydroxyethyl)adipamide of Comparative Preparation Example 1 was added instead of the cross-linking agent of Preparation Example 4.

Experimental Example

Preparation of a Liquid Crystal Alignment Cell

A liquid crystal alignment cell was prepared using each liquid crystal alignment composition prepared in Examples and Comparative Examples.

Specifically, on the upper and lower substrates for voltage holding ratio (VHR) in which an ITO electrode of 1 cm×1 cm, 60 nm thickness was patterned on a 2.5 cm×2.7 cm rectangular glass substrate, a liquid crystal alignment composition was respectively applied by spin coating. Subsequently, the substrates coated with the liquid crystal alignment agent were placed on a hot plate of about 80° C., and dried for 3 minutes to evaporate solvents.

In order to progress alignment treatment of the obtained coating, each coating of the upper/lower substrates was irradiated by 254 nm UV rays at the exposure of 0.1-1.0 Poi using an exposure equipment to which a line polarizer is attached. Thereafter, the alignment-treated upper/lower substrates were baked (cured) in an oven of about 230° C. for 30 minutes to obtain liquid crystal alignment films respectively having a film thickness of 0.1 μm. Thereafter, a sealing agent into which a 4.5 μm ball spacer was impregnated was applied at the edge of the upper substrate except a liquid crystal inlet. And, the upper and lower substrates were arranged such that the liquid crystal alignment films formed thereon face each other and the alignment directions are parallel to each other, and then, the upper and lower substrates were combined, and by UV and thermal curing of the sealing agent, an empty cell was prepared. And, into the empty cell, liquid crystal was introduced, and the inlet was sealed with a sealing agent, thus preparing a liquid crystal alignment cell.

1) Evaluation of Liquid Crystal Alignment Property

To the upper and lower substrates of the liquid crystal cell prepared above, polarization plates were attached perpendicularly to each other. And, the liquid crystal cell to which the polarization plates were attached was placed on a backlight with a brightness of 7,000 cd/m², and light leak was observed with the naked eye. Wherein, if the alignment property of the liquid crystal alignment film is excellent and liquid crystal is arranged well, light may not pass through the upper and lower polarization plates attached perpendicularly to each other, and it may be observed dark without defects. Such a case was evaluated as 'good', and if light leak such as bright point or liquid crystal flow mark is observed, evaluated as 'bad' in the Table 3.

TABLE 2

| | Weight ratio of polymers | | | Cross-linking agent | |
| | first polymer | Second polymer | third polymer | (first polymer:third polymer:second polymer) | kind | Input (wt %) |
| --- | --- | --- | --- | --- | --- | --- |
| Example 1 | P-1 | Q-1 | R-1 | 2:5:3 | Preparation Example 4 | 5 |
| Example 2 | P-1 | Q-1 | R-1 | 2:5:3 | Preparation Example 4 | 10 |
| Comparative Example 1 | P-1 | Q-1 | R-1 | 2:5:3 | — | — |
| Comparative Example 2 | P-1 | Q-1 | R-1 | 2:5:3 | Comparative Preparation Example 1 | 5 |

2) Measurement of Voltage Holding Ratio (VHR)

The electrical property, voltage holing ratio (VHR) of the above prepared liquid crystal alignment cell was measured using 6254 equipment of TOYO Corporation. The voltage holding ratio was measured at 1 Hz, 60° C. (VHR 60° C. 1 Hz p-LC condition). The measurement results of voltage holding ratio of the liquid crystal alignment cells were shown in the following Table 3.

3) Evaluation of Liquid Crystal Alignment Stability (AC Afterimage)

To the upper and lower substrates of the liquid crystal alignment cell prepared above, polarization plates were attached perpendicularly to each other. The liquid crystal cell to which the polarization plates were attached was placed on a backlight of 7,000 cd/m$^2$, and luminance in the state of black was observed using a luminance meter PR-788. And, the liquid crystal was driven at room temperature, alternating current voltage of 7V for 120 hours. Thereafter, while the voltage of the liquid crystal cell was turned off, luminance in the state of black was observed as explained above. A difference between the initial luminance (L0) measured before driving the liquid crystal cell and the later luminance ($L_1$) measured after driving was divided by the initial luminance (L0) and multiplied by 100, thus calculating luminance change rate. As the calculated luminance change rate is closer to 0%, it means that alignment stability is excellent. Through the measurement result of luminance change rate, the level of afterimage was evaluated according to the following standard. It is preferable that AC afterimage is minimized, and in the measurement result, if the luminance change rate is less than 5%, it is evaluated as 'excellent'; if the luminance change rate is 5% to 10%, evaluated as 'average'; and if the luminance change rate is greater than 10%, evaluated as 'bad', and the results were shown in the following Table 3.

4) Film Strength

For the liquid crystal alignment films obtained in Examples and Comparative Examples, the surface of each liquid crystal alignment film was rubbed while rotating at 1000 rpm using rubbing machine of Sindo Engineering, and then, a haze value was measured using a hazemeter, and a difference with a haze value before rubbing was calculated by the following Mathematical Formula 1, thus evaluating film strength. The smaller the haze change value, more excellent the film strength.

Film strength=haze of liquid crystal alignment film after rubbing−haze of liquid crystal alignment film before rubbing  [Mathematical Formula 1]

5) Degree of Imidization (%)

For the liquid crystal alignment films obtained from the liquid crystal alignment compositions of Examples and Comparative Examples, FT-IR spectrum was measured by ATR method, thereby measuring the rate of imide structures in the polymer molecule included in the alignment film.

As shown in Table 3, it was confirmed that the liquid crystal alignment compositions of Examples containing the cross-linking agent of Preparation Example 4 together with polyimide-based polymer not only exhibit very low haze change value before and after rubbing (1% to 2%), thus exhibiting excellent film strength, but also exhibit high degree of imidization (98% or more).

To the contrary, it was confirmed that in the case of the alignment film obtained from the liquid crystal alignment composition of Comparative Example 1 that does not contain the cross-linking agent of Preparation Example 4, haze change value before and after rubbing rapidly increases to 50%, and thus, the film strength is very bad. It was also confirmed that the luminance change rate is 5% to 10%, and thus, the alignment film of Comparative Example 1 is inferior to Examples.

Meanwhile, in the case of the cross-linking agent of Comparative Preparation Example 1 used in the liquid crystal alignment composition of Comparative Example 2, the degree of imidization was 95%, which decreased compared to Examples. And, in the case of the alignment film obtained from the liquid crystal alignment composition of Comparative Example 2, haze change value before and after rubbing was 3%, and thus, it was confirmed that the film strength is inferior to Examples. Moreover, luminance change rate was 5% to 10%, and thus, it was confirmed that the alignment stability is inferior to Examples, and the liquid crystal alignment property is also bad.

The invention claimed is:

1. A liquid crystal alignment composition comprising a first liquid crystal alignment polymer comprising at least one repeat unit selected from a repeat unit represented by Chemical Formula 1, a repeat unit represented by Chemical Formula 2, or a repeat unit represented by Chemical Formula 3;

a second liquid crystal alignment polymer comprising at least one repeat unit selected from a repeat unit represented by Chemical Formula 4, a repeat unit represented by Chemical Formula 5, or repeat units represented by Chemical Formula 6;

a third liquid crystal alignment polymer comprising at least one repeat unit selected from a repeat unit represented by Chemical Formula 7, a repeat unit represented by Chemical Formula 8, or a repeat unit represented by Chemical Formula 9; and a cross-linking agent compound represented by Chemical Formula 16:

TABLE 3

| | Liquid crystal alignment property | Alignment stability | VHR (%) | Film strength (%) | Degree of imidization (%) |
|---|---|---|---|---|---|
| Example 1 | Good | Excellent | 76 | 1 to 2 | 98 |
| Example 2 | Good | Excellent | 76 | 1 | 98 |
| Comparative Example 1 | Good | Average | 76 | 50 | 90 |
| Comparative Example 2 | Bad | Average | 76 | 3 | 95 |

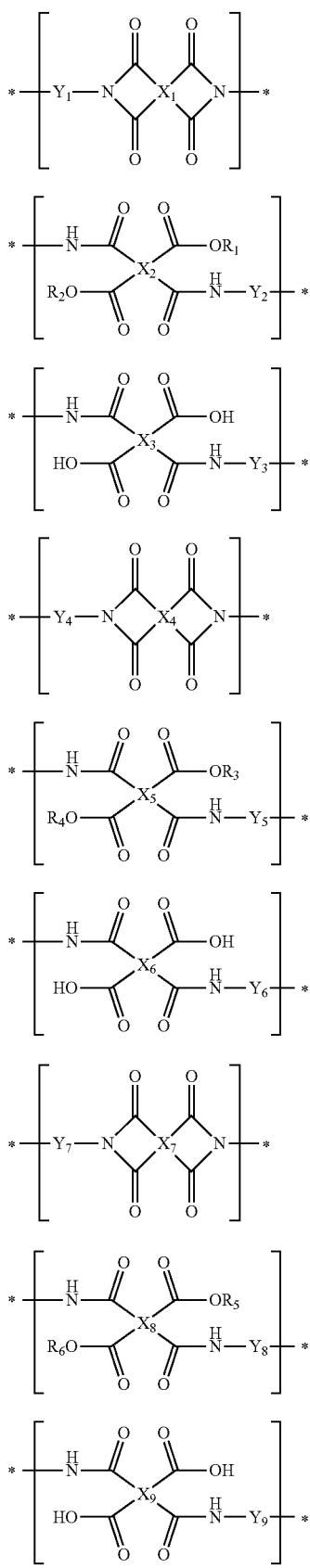

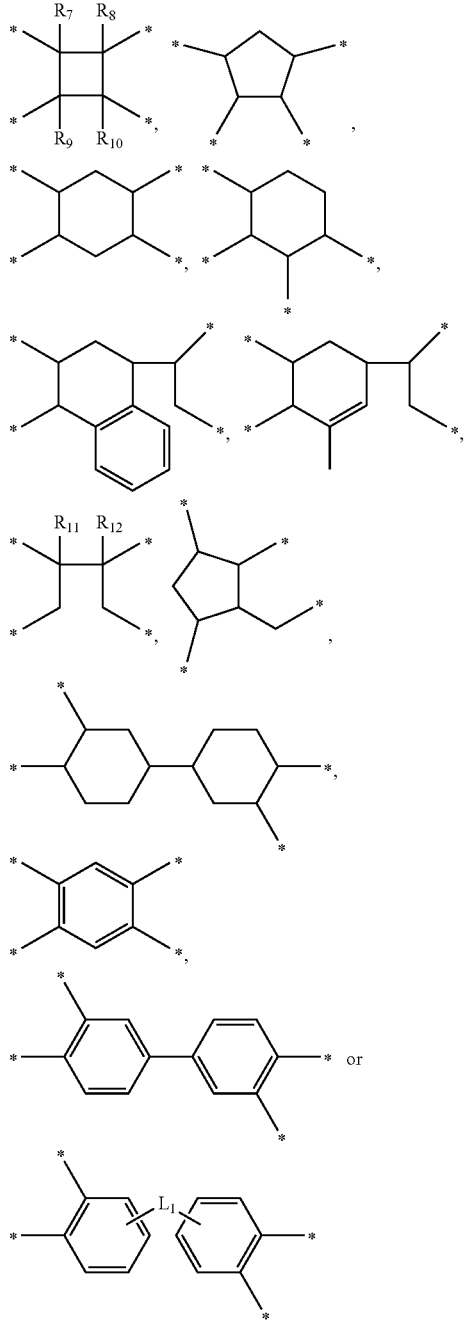

in the Chemical Formulae 1 to 9,
at least one of $R_1$ and $R_2$ is a C1-10 alkyl group, and the other is hydrogen,
at least one of $R_3$ and $R_4$ is a C1-10 alkyl group, and the other is hydrogen,
at least one of $R_5$ and $R_6$ is a C1-10 alkyl group, and the other is hydrogen,
$X^1$ to $X^9$ are each independently, a tetravalent organic group represented by Chemical Formula 10, in the Chemical Formula 10,
$R_7$ to $R_{12}$ are each independently, hydrogen, or a C1-6 alkyl group, $L_1$ is a single bond, —O—, —CO—, —COO—, —S—, —SO—, —SO$_2$—, —CR$_{13}$R$_{14}$—, —(CH$_2$)$_z$—, —O(CH$_2$)$_z$O—, —COO(CH$_2$)$_z$OCO—, —CONH—, phenylene, or a combination thereof, wherein $R_{13}$ and $R_{14}$ are each independently, hydrogen, a C1-10 alkyl group or a fluoroalkyl group, and z is an integer of 1 to 10, $Y_1$ to $Y_3$ are each independently, a divalent organic group represented by Chemical Formula 11,

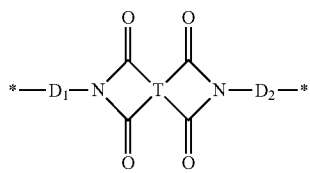

[Chemical Formula 11]

in the Chemical Formula 11,
T is a tetravalent organic group represented by the Chemical Formula 10, and
$D_1$ and $D_2$ are each independently, a C1-20 alkylene group, a C1-10 heteroalkylene group, a C3-20 cycloalkylene group, a C6-20 arylene group, or a C2-20 heteroarylene group, $Y_4$ to $Y_6$ are each independently, a divalent organic group represented by Chemical Formula 12,

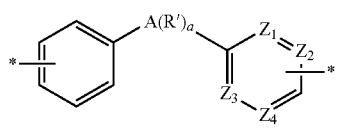

[Chemical Formula 12]

in the Chemical Formula 12,
A is a Group 15 element selected from nitrogen (N), phosphorus (P), arsenic (As), antimony (Sb) or bismuth (Bi),
R is hydrogen, or a C1-10 alkyl group,
a is an integer of 1 to 3, and
at least one of $Z_1$ to $Z_4$ is nitrogen, and the others are carbon, $Y_7$ to $Y_9$ are each independently, a divalent organic group represented by Chemical Formula 13,

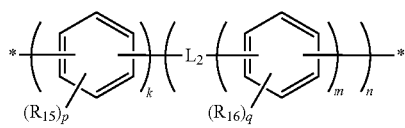

[Chemical Formula 13]

in the Chemical Formula 13,
$R_{15}$ and $R_{16}$ are each independently, hydrogen, halogen, cyano, nitrile, C1-10 alkyl, C1-10 alkenyl, C1-10 alkoxy, C1-10 fluoroalkyl, or C1-10 fluoroalkoxy,
p and q are each independently, an integer of 0 to 4,
$L_2$ is a single bond, —O—, —CO—, —S—, —SO$_2$—, —C(CH$_3$)$_2$—, —C(CF$_3$)$_2$—, —COO—, —(CH$_2$)$_y$—, —O(CH$_2$)$_y$O—, —O(CH$_2$)$_y$—, —NH—, —NH (CH$_2$)$_y$—NH—, —NH(CH$_2$)$_y$O—, —OCH$_2$—C(CH$_3$)$_2$—CH$_2$O—, —COO—(CH$_2$)$_y$—OCO—, or —OCO—(CH$_2$)$_y$—COO—, y is an integer of 1 to 10,
k and m are each independently, an integer of 0 to 1, and
n is an integer of 0 to 3,

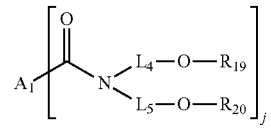

[Chemical Formula 16]

in the Chemical Formula 16,
$A_1$ is at least one of mono- to tetravalent functional groups,
j is an integer of 1 to 4,
$L_4$ and $L_5$ are identical to or different from each other, and each independently, a C1-10 alkylene group or a C6-20 arylene group, and
$R_{19}$ and $R_{20}$ are each independently, a silicon-containing monovalent functional group.

2. The liquid crystal alignment composition according to claim 1, wherein in the Chemical Formula 12, one of $Z_1$ to $Z_4$ is nitrogen, and the others are carbon.

3. The liquid crystal alignment composition according to claim 1, wherein in the Chemical Formula 12, one of $Z_1$ and $Z_3$ is nitrogen and the other is carbon, and $Z_2$ and $Z_4$ are carbon.

4. The liquid crystal alignment composition according to claim 1, wherein in the Chemical Formula 12, A is nitrogen, R' is hydrogen, and a is 1.

5. The liquid crystal alignment composition according to claim 1, wherein the Chemical Formula 12 includes at least one functional group selected from a functional group represented by Chemical Formula 12-1, a functional group represented by Chemical Formula 12-2 or a functional group represented by Chemical Formula 12-3:

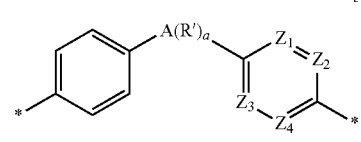

[Chemical Formula 12-1]

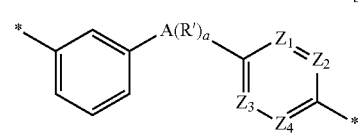

[Chemical Formula 12-2]

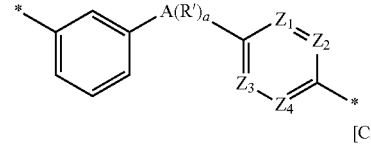

[Chemical Formula 12-3]

in the Chemical Formulae 12-1 to 12-3,
A, $Z_1$ to $Z_4$, R', and a are as defined in claim 1.

6. The liquid crystal alignment composition according to claim 1, wherein in the Chemical Formula 11, T is a functional group represented by Chemical Formula 10-1, or a functional group represented by Chemical Formula 10-2:

[Chemical Formula 10-1]

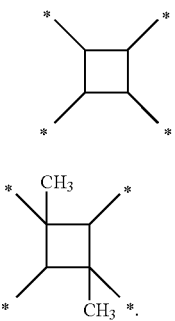

[Chemical Formula 10-2]

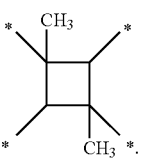

7. The liquid crystal alignment composition according to claim 1, comprising the second liquid crystal alignment polymer in an amount of 10 parts by weight to 1000 parts by weight based on 100 parts by weight of the first liquid crystal alignment polymer.

8. The liquid crystal alignment composition according to claim 1, comprising the third liquid crystal alignment polymer in an amount of 10 parts by weight to 1000 parts by weight based on 100 parts by weight of the first liquid crystal alignment polymer.

9. The liquid crystal alignment composition according to claim 1, wherein in the Chemical Formula 16,
$A_1$ is a C1-10 alkylene group,
j is 2,
$L_4$ and $L_5$ are each independently, a C1-5 alkylene group, and
$R_{19}$ and $R_{20}$ are each independently, the silicon-containing monovalent functional group.

10. The liquid crystal alignment composition according to claim 1, wherein the silicon-containing monofunctional group is represented by Chemical Formula 17:

[Chemical Formula 17]

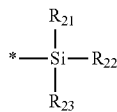

in the Chemical Formula 17, $R_{21}$, $R_{22}$ and $R_{23}$ are each independently, hydrogen, or C1-10 alkyl.

11. A method for preparing a liquid crystal alignment film, comprising steps of:
applying the liquid crystal alignment composition of claim 1 on a substrate to form a coating;
drying the coating;
irradiating light to the coating or rubbing the coating to progress alignment treatment; and
heat treating the alignment-treated coating to cure.

12. The method according to claim 11, wherein in the step of heat treating the alignment-treated coating to cure, the alignment-treated coating contains a cross-linking agent compound represented by Chemical Formula 18:

[Chemical Formula 18]

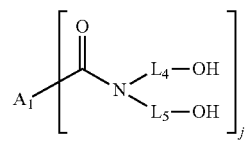

in the Chemical Formula 18,
$A_1$, j, $L_4$ and $L_5$ are as defined in claim 1.

13. A liquid crystal alignment film comprising an aligned and cured product of the liquid crystal alignment composition of claim 1.

14. A liquid crystal display comprising the liquid crystal alignment film of claim 13.

15. The liquid crystal alignment composition according to claim 1, comprising the cross-linking agent compound represented by Chemical Formula 16 in an amount of 1 to 30 wt % based on the total weight of the liquid crystal alignment composition.

* * * * *